(12) United States Patent
Klausner et al.

(10) Patent No.: US 12,715,324 B2
(45) Date of Patent: Aug. 25, 2026

(54) ELECTRIC CONTACT UNIT

(71) Applicant: FRAUNHOFER-GESELLSCHAFT ZUR FÖRDERUNG DER ANGEWANDTEN FORSCHUNG E.V., Munich (DE)

(72) Inventors: Sven Klausner, Dresden (DE); Tim Vorwerk, Dresden (DE); Christian Seiler, Dresden (DE)

(73) Assignee: FRAUNHOFER-GESELLSCHAFT ZUR FORDERUNG DER ANGEWANDTEN FORSCHUNG E.V., Munich (DE)

( * ) Notice: Subject to any disclaimer, the term of this patent is extended or adjusted under 35 U.S.C. 154(b) by 373 days.

(21) Appl. No.: 18/546,764

(22) PCT Filed: Feb. 15, 2022

(86) PCT No.: PCT/EP2022/053709

§ 371 (c)(1),
(2) Date: Aug. 16, 2023

(87) PCT Pub. No.: WO2022/175286

PCT Pub. Date: Aug. 25, 2022

(65) Prior Publication Data

US 2024/0131939 A1 Apr. 25, 2024
US 2024/0227590 A9 Jul. 11, 2024

(30) Foreign Application Priority Data

Feb. 16, 2021 (DE) ..................... 10 2021 201 472.0

(51) Int. Cl.
*B60L 53/16* (2019.01)
*B60L 53/18* (2019.01)
(Continued)

(52) U.S. Cl.
CPC ............... *B60L 53/16* (2019.02); *B60L 53/18* (2019.02); *H01R 13/6205* (2013.01);
(Continued)

(58) Field of Classification Search
CPC ..... B60L 53/16; B60L 53/18; H01R 13/6205; H01R 13/6278; H01R 13/631; H01R 43/26
See application file for complete search history.

(56) References Cited

U.S. PATENT DOCUMENTS 7,950,943 B2 * 5/2011 Ohtomo .................. B60L 53/16 439/299
8,550,833 B2 * 10/2013 Martin .............. H01R 13/6397 439/372
(Continued)

FOREIGN PATENT DOCUMENTS

DE 19544942 A2 12/1995
DE 19705798 A1 2/1997
(Continued)

OTHER PUBLICATIONS

International Search Report and Written Opinion issued in PCT/EP2022/053709, mailed Jun. 13, 2022.
(Continued)

*Primary Examiner* — Thanh Tam T Le
(74) *Attorney, Agent, or Firm* — Nelson Mullins Riley & Scarborough LLP

(57) ABSTRACT

The invention relates to a contact unit (1) for establishing an electrically conducting connection, comprising: a first connecting part (100) including a first electrical contact (121) and a second connecting part (200) including a second electrical contact (221), wherein the first connecting part (100) comprises a first section (101) and a second section (102); the first connecting part (100) can be positioned with
(Continued)

respect to the second connecting part (200) along the contacting axis (11) in an idle position; the first electrical contact (121) and the second electrical contact (221) are designed, upon contact, to establish an electrically conducting connection between the first connecting part (100) and the second connecting part (200), which is designed to conduct electrical energy; the contact unit (1) furthermore comprising a positioning unit (131, 110, 210) for an idle position; and an actuator (140), which is designed to displace the second section (102) of the first connecting part (100) in the contacting direction (12) relative to the first section (101).

15 Claims, 12 Drawing Sheets

(51) Int. Cl.
*H01R 13/62* (2006.01)
*H01R 13/627* (2006.01)
*H01R 13/631* (2006.01)
*H01R 43/26* (2006.01)

(52) U.S. Cl.
CPC ....... *H01R 13/6278* (2013.01); *H01R 13/631* (2013.01); *H01R 43/26* (2013.01)

(56) References Cited

U.S. PATENT DOCUMENTS 8,951,060 B2 * 2/2015 Meyer-Ebeling .... H01R 13/639 320/109
9,246,270 B2 1/2016 Toratani et al.
9,744,866 B2 * 8/2017 Murakami ......... H01R 13/6395
9,893,451 B2 * 2/2018 Zhang ................ H01R 13/6205
10,069,245 B2 * 9/2018 Huhmann ............ H01R 13/514
10,522,943 B1 * 12/2019 Termini ................. H01R 24/86
11,374,367 B2 * 6/2022 Johnson ............... H01R 13/641
11,639,616 B2 * 5/2023 Dahmer .................. E05B 83/28 292/1
11,850,958 B2 * 12/2023 Gorantla Narayana Murthy ........ B60L 3/00
2012/0088384 A1 4/2012 Hori et al.
2017/0166070 A1 6/2017 Dunger et al.
2017/0365959 A1 12/2017 Flechl

FOREIGN PATENT DOCUMENTS

DE 102011114321 A1 3/2013
DE 102014226755 A1 6/2016
DE 102018001654 A1 3/2018
EP 3043421 B1 4/2018
EP 3418201 A1 12/2018
EP 3471213 A1 4/2019
EP 3579354 A1 12/2019
EP 3605744 A1 2/2020
JP 2019200989 A 11/2019
WO 2015112355 A1 7/2015
WO 2016119001 A1 8/2016

OTHER PUBLICATIONS

Notice of Reasons for Refusal issued in Japanese Patent Application No. 2023-548754, dated Sep. 24, 2025.

* cited by examiner

ELECTRIC CONTACT UNIT

CROSS REFERENCE TO RELATED APPLICATIONS

This application is a U.S. National Stage entry of PCT Application No. PCT/EP2022/053709, internationally filed on Feb. 14, 2022, which claims priority to German Patent Application No. 10 2021 201 472.0, filed Feb. 16, 2021. Both applications are incorporated herein by reference in their entireties.

TECHNICAL FIELD

The application relates to an electrical contact unit, to a method for operating the electrical contact unit, and to a use of the electrical contact unit. The electrical contact unit may be used, for example, for charging an electrical energy storage battery of a vehicle.

BACKGROUND

One necessary condition for implementing a battery-electric drive concept, for example for a vehicle, is the availability of a sufficiently large time buffer for recharging the storage battery by utilizing an operation-induced or usage-induced downtime. Due to the limited nature of this time buffer, the only option for opening up further application scenarios is to further develop a rapid charging capability of the storage battery, that is, the ability to recharge in a short time, and of an associated charging system.

Progress to be expected with respect to an increased power density of storage batteries is already resulting in an increasing charging rate. The charging rate is a measure of the relationship of a maximum possible charging current, measured in ampere (A), based on a rated capacity of the storage battery, measured in ampere hours (Ah). The charging rate is a direct expression of how quickly the storage battery can be charged.

A high charging rate causes a high charging current to flow. A contact plug system available in the market is subject to physically induced limits with respect to high charging currents, for example due to a quality of an electrical connection established by contact with electrical contacts of the contact plug system. To ensure a sufficiently high quality of the electrical connection, that is, a low contact resistance, either a large contact surface of the electrical contacts and/or a high contact force between the electrical contacts is required. The latter is subject to natural boundaries when solely human handling is involved. Furthermore, increasing the contact surface for transmitting very large currents in the conventional contact plug system would result in component dimensions that are not conducive to human handling.

SUMMARY

It is the object of the present invention to provide an electrical contact unit for establishing an electrical connection, in particular an electrical power connection, which is suitable for electrically conducting an electrical current, in particular a high electrical current, and to a method for the operation thereof. The object also encompasses a possible use of the electrical contact unit for charging an electrical energy storage battery.

The object is achieved according to the features of the independent claims. Further advantageous embodiments of the invention are described in the claims that refer back to the independent claims.

The electrical contact unit comprises a first connecting part including a first electrical contact and a second connecting part including a second electrical contact. An electrical contact is a device that comprises an electrically conducting material, for example a metal, an alloy, or an electrically conductive organic material, or an electrically conductive embodiment of carbon. An electrical contact is designed to establish an electrically conducting connection with a further electrical contact or an electrical conductor by contact therewith. A contact can, for example, be an integral part of another device, be connected thereto or be designed as a separate device. It is possible, for example, for the first contact to be connected to the first connecting part and for the second contact to be connected to the second connecting part. The connection can be realized in the case of the first and/or second electrical contacts in each case with an elastic preloading element, for example a mechanical spring, so that the two contacts, when resting against one another, can make contact with one another with a preloading force.

The first connecting part and the second connecting part are arranged so as to be movable with respect to one another along a contacting axis, which extends in a contacting direction. It is possible, for example, for the first connecting part to be arranged with respect to the contacting axis in such a way that the contacting axis extends through a, for example central, point of the first connecting part. It is also possible, for example, for the second connecting part to be arranged with respect to the contacting axis in such a way that the contacting axis extends through a, for example central, point of the second connecting part. The first connecting part comprises a first section and a second section, wherein the second section is movable with respect to the first section, and the first electrical contact is arranged at the second section. The first connecting part can be positioned with respect to the second connecting part along the contacting axis in such a way that the first section of the first connecting part ends up in an idle position with respect to the second connecting part.

The first electrical contact and the second electrical contact are designed, when they make contact with one another, to establish an electrically conducting connection between the first connecting part and the second connecting part. This means that an electrical conductor which is arranged in or at the first connecting part and is electrically conductively connected to the first electrical contact brought into an electrical connection with an electrical conductor which is arranged in or at the second connecting part and is electrically conductively connected to the second electrical contact by way of contact between the first electrical contact and the second electrical contact. The electrical connection is designed to conduct electrical energy, for example by conducting an electrical current.

The electrical contact unit furthermore comprises a positioning unit, which is designed to predefine the idle position. This positioning unit is used to make it possible to spatially position the first connecting part, and in particular the first section of the first connecting part, with respect to the second connecting part, for example, in such a way that, proceeding from the idle position, the first and second electrical contacts can be brought in contact with one another. This positioning of the first connecting part with respect to the second connecting part is advantageous since in this way, proceeding from the idle position, it is possible to bring the first and second electrical contacts together, or separate the first and second electrical contacts from one another, using a sequence of a small number of movements of the first contact that are easy to implement.

The positioning unit can, for example, be implemented with a stop edge at the first connecting part, with which the first connecting part can strike against the second connecting part. The positioning unit can, for example, also be implemented as a recess in the first connecting part, with which a spring-mounted locking element that is attached to the second connecting part and, for example, can have a spherical or a cylindrical or, in particular, a rounded shape, can then be brought into engagement when the first connecting part is in the idle position with respect to the second connecting part. A further exemplary option results when, for example, an optical system, comprising a light sensor and optionally a provided light source, outputs a signal when the first connecting part is in the idle position with respect to the second connecting part, the signal differing from a signal when the first connecting part is not in the idle position with respect to the second connecting part.

A further exemplary implementation option results, similarly to the optical option, through the use of a magnet and a Hall sensor, wherein the magnet is arranged at the first connecting part, and the Hall sensor is arranged at the second connecting part, or vice versa, in each case in a defined position with respect to one another. The Hall sensor detects a magnetic field originating from the magnet and outputs a signal corresponding thereto, wherein the signal, when the first connecting part is in the idle position with respect to the second connecting part, differs from a signal when the first connecting part is not in the idle position with respect to the second connecting part. Distance sensors, such as eddy current sensors, or inductive sensors can be used in a similar manner for determining the position.

Another option for predefining the idle position is, for example, to use a switch that is only actuated in the idle position, or an image-based system, for example comprising a camera, in which the position of the first connecting part with respect to the second connecting part can be determined using an image evaluation method, and a signal corresponding thereto is provided when the first connecting part is in the idle position with respect to the second connecting part.

The electrical contact unit moreover comprises an actuator, which is designed, when the first section of the first connecting part is in the idle position, to displace the second section of the first connecting part in the contacting direction relative to the first section in such a way that the second section of the first connecting part and the second connecting part rest against one another in the contacting direction, and the first electrical contact and the second electrical contact are in contact with one another.

The actuator can comprise two sections that are movable with respect to one another, for example a fixation section and a movement section. This movement can, for example, be driven with the aid of electrical energy, wherein the movement can be provided via an electrically operated motor. Other drive forms are also conceivable in this connection, for example a drive that comprises a hydraulic and/or pneumatic and/or magnetic and/or a further mechanical components, such as a gearbox. If the actuator is now, for example, fixed by way of the fixation section to the first section of the first connecting part, a movement of the movement section and, for example, striking of the movement section against the second section of the first connecting part can cause a movement of the second section relative to the first section. The actuator can, for example, be a linear actuator, which effectuates a linear movement. In this way, it is also possible for the fixation section and the movement section to carry out a linear movement with respect to one another.

As a result of the contact between the first and second contacts, an electrically conducting connection is made possible between the two contacts, wherein a flow of current between the first connecting part and the second connecting part is enabled via this electrically conducting connection.

The contact unit can comprise a latching element. It is conceivable that the latching element is movable between a latching position and an unlatching position. It is possible that the latching element, in the latching position, prevents a movement of the first section of the first connecting part relative to the second connecting part. It is also conceivable that the latching element, in the latching position, allows a movement of the second section of the first connecting part relative to the first section of the first connecting part. Additionally, the option exists that the latching element, in the unlatching position, allows a movement of the first section of the first connecting part relative to the second connecting part. Likewise, the latching element, in the unlatching position, can prevent a movement of the second section of the first connecting part relative to the first section of the first connecting part.

In this respect, the latching element can be associated with multiple advantages.

On the one hand, it is thus possible to latch the first section of the first connecting part relative to the second connecting part. Latching, here, shall be understood to mean that the first section and the second connecting part cannot be moved significantly with respect to one another when the latching element is in the latching position, and it is then not possible to inadvertently remove the second connecting part from the second connecting part. Removal during a charging process would be dangerous for users due to the high charging currents to be expected and could also result in at least partial destruction of the electrical contact unit, or equipment parts connected thereto, for example as a result of a fire due to loose current-carrying contacts.

On the other hand, latching by way of the latching element can allow potential contact forces to be provided between the first and second connecting parts, and in particular between the first electrical contact and the second electrical contact. The latching would, for example, enable in particular very high contact forces.

Furthermore, it is conceivable that, in the unlatching position, the movement of the second section with respect to the first section is suppressed. This would be advantageous since in this way, for example in a state in which the first connecting part is not in the idle position, a generally undesirable movement of the second section with respect to the first section can be suppressed. In this way, it is possible that the sections of the first connecting part are held together in a compact shape, and cannot move away from one another, in particular in the case in which the first connecting part is not in the idle position.

In one embodiment, it is possible that the first section of the first connecting part has a latching recess, and that the second connecting part has a further recess. It is then conceivable that the latching element, when this element is in the latching position, is engaged with the latching recess of the first section of the first connecting part and the recess of the second connecting part. It is conceivable that the latching recess of the first section and the recess of the second connecting part are arranged opposite one another, in particular when the first connecting part is in the idle position with respect to the second connecting part, and that, for example, the latching element is inserted through the latching recess of the first section into the recess of the second connecting part and ends up resting there, which corresponds to the latching position. Moreover, it is conceivable that, in the unlatching position, the latching element is, or sections thereof are, neither located in the latching recess of the first section nor in the recess of the second connecting part.

Furthermore, it is possible that the actuator is connected to the first section of the first connecting part. In this way, the movement of the second section of the first connecting part relative to the first section can be implemented particularly well. In particular when the first section and the actuator are rigidly connected to one another, for example at the fixation section, the actuator and the first section together form a reference for a movement of the second section relative thereto, which can be effectuated by the movement of the movement section of the actuator against a surface of the second section of the first connecting part. By moving the movement section against the surface of the second section of the first connecting part, a force can be exerted on the second section, which can cause a displacement of the second section of the first connecting part so that, as a result of the displacement, the second section of the first connecting part and the second connecting part rest against one another in the contacting direction, and the first electrical contact and the second electrical contact are in contact with one another.

In one embodiment, it is possible for the actuator to be designed to move the latching element from the latching position into the unlatching position, and vice versa. For this purpose, the actuator may be kinematically coupled to the latching element, for example by way of a lever mechanism, a guide rail or a guide groove. If the fixation section of the actuator, for example, is now connected to the first section, in particular a rigid connection being conceivable here, the movement section of the actuator can be coupled to the latching element with the aid of the kinematic coupling. A movement of the movement section of the actuator, which takes place relative to the first section of the first connecting part, can then be transmitted to the latching element. This can be effectuated by a movement of the latching element relative to the first section of the first connecting part, and more particularly in such a way that, for example, the latching element is pushed into, or at least also partially through, the latching recess of the first section of the first connecting part and/or into the recess of the second connecting part, or is pulled in the opposite direction out of the recess of the second connecting part and/or the latching recess.

The contact unit can comprise a solenoid and a magnet counter-element. It is possible for the solenoid, in an active state and when the second section of the first connecting part and the second connecting part rest against one another in the contacting direction, to provide a magnetic attraction force between the second section of the first connecting part and the second connecting part by means of a magnetic field, together with the magnet counter-element. The magnetic attraction force can be at least so large that the second section of the first connecting part is held by this force in a position in which the first electrical contact and the second electrical contact make contact with one another. The solenoid and the magnet counter-element can thus ensure that an electrical connection is maintained between the first electrical contact and the second electrical contact. This is also possible when the actuator does not exert a force on the second section of the first connecting part. The latter may be the case, for example, when the movement section of the actuator is moved relative to the fixation section in such a way that the movement section does not exert a force on the surface of the second section of the first connecting part. In addition, it is also possible that a contact force is built up between the first electrical contact and the second electrical contact as a result of the magnetic attraction force, which can enhance the quality of the electrical connection between the first and second electrical contacts.

The magnet counter-element comprises a magnetic material, for example iron, on which a magnetic field has an attracting effect.

The solenoid is in the active state when electrical current flows through a coil winding of the solenoid, and a magnetic field is provided in this way. It is thus possible to transfer the solenoid into the active state by activating an electrical current flow through the coil winding, for example using a switch. The solenoid can be transferred into an inactive state when the electrical current flow through the coil winding is deactivated, for example using a switch. The switch for activating or deactivating the electrical current flow through the coil winding of the solenoid can be configured to be controllable, for example by a control device.

The contact unit can be embodied in such a way that the first electrical contact includes a first power contact, and the second electrical contact includes a second power contact. The power contact is designed to conduct, that is, to transport, electrical energy. In general, the power contact is configured so as to be suitable to conduct at least a predefined amount of electrical energy, that is, electrical power, per predefined unit of time. To do so, in general an extension of the power contact that is greater than or equal to a material-dependent minimum value is selected.

It is possible for the first electrical contact and the second electrical contact to be designed to conduct high electrical power at an electrical voltage of up to 1500 volt, and at an electrical current of up to 1600 amperes, preferably up to 1900 amperes, and particularly preferably up to 3000 amperes. An electrical connection that is able to conduct such a current can be a high current connection, or can be referred to as a high current connection, for example or in particular without any time restriction. The electrical connection that can be established by the first electrical contact making contact with the second electrical contact can be a high current connection. The electrical current can be a direct current, for example. However, an alternating current is also conceivable.

In one embodiment of the contact unit, it is possible for the first electrical contact and the second electrical contact to be arranged opposite one another, each at a surface that is in each case oriented substantially parallel to and spaced apart from the contacting axis. At the same time or as an alternative, it is possible for the first electrical contact and the second electrical contact to be arranged opposite one another, each at a surface that is in each case oriented substantially perpendicular to the contacting axis. In this regard, it becomes apparent that available surfaces of the first connecting part and of the second connecting part can be efficiently utilized for arranging the electrical contacts. This may be significant when, for example, an electrical contact comprises multiple section that have to be spaced apart from one another, for example for safety reasons. As a result of the efficient use of the available surfaces, the volume of the contact unit can be limited to a necessary degree.

In one embodiment, it is conceivable that the first connecting part includes a first protective ground conductor contact, and the second connecting part includes a second protective ground conductor contact. It is possible for the first protective ground conductor contact to be electrically connected to electrical ground potential. In addition, it is possible for the first protective ground conductor contact to establish an electrical connection between the second protective ground conductor contact and the electrical ground potential upon contact with the second protective ground conductor contact. In principle, it is also conceivable for the roles of the first and second protective ground conductor to be reversed. This means that, for example, the second protective ground conductor contact is electrically connected to the electrical ground potential. It is then also possible for the second protective ground conductor contact to establish an electrical connection between the first protective ground conductor contact and the electrical ground potential upon contact with the first protective ground conductor contact.

The first and second protective ground conductor contacts can comprise an electrically conducting material, for example a metal, an alloy, or an electrically conductive organic material, or an electrically conductive embodiment of carbon.

The advantageous effect of a protective ground conductor contact is that a potential fault current can be dissipated to the ground potential and, in this way, a harmful effect, for example for a user of the contact unit or the contact unit or connected equipment parts, can be reduced.

The option exists for the second protective ground conductor contact to cooperate with a protective ground conductor preloading element, which is designed to provide a contact force between the first and second protective ground conductor contacts when the first protective ground conductor contact makes contact with the second protective ground conductor contact. For example, the protective ground conductor preloading element can be a mechanical spring, which, on the one hand, is connected to the second connecting part and, on the other hand, is connected to the second protective ground conductor contact. It is conceivable that the force action associated with the protective ground conductor preloading element acts in the contacting direction. As a result of the contact force between the first and second protective ground conductor contacts, the quality of the electrical connection between the two protective ground conductor contacts can be enhanced, for example by a reduction in a contact resistance caused thereby. In addition, this can reduce a risk of inadvertently interrupting the contact between the two protective ground conductor contacts, and thereby interrupting the electrical connection connected thereto.

As an alternative, it is also possible for the first protective ground conductor contact to cooperate with a protective ground conductor preloading element, wherein the explanations provided regarding the protective ground conductor preloading element cooperating with the second protective ground conductor contact apply analogously. It is only possible then that the protective ground conductor preloading element is attached between the second section of the first connecting part and the first protective ground conductor contact.

In one embodiment, it is conceivable that the first and second protective ground conductor contacts are arranged opposite one another, each at a surface that is in each case oriented substantially perpendicular to the contacting axis. However, it may also be that the first protective ground conductor contact and the second protective ground conductor contact are arranged opposite one another, each at a surface that is in each case oriented substantially parallel to and spaced apart from the contacting axis. It becomes apparent again that available surfaces of the first connecting part and of the second connecting part can be efficiently utilized for arranging the electrical contacts. This may be significant when, for example, an electrical contact comprises multiple section that have to be spaced apart from one another, for example for safety reasons. As a result of the efficient use of the available surfaces, the volume of the contact unit can be limited to a necessary degree.

It is consistent with the present disclosure when the first connecting part includes a first control pilot contact, and the second connecting part includes a second control pilot contact. It is possible that an evaluatable electrical connection is established between the first and second control pilot contacts when these make contact with one another.

The first and second control pilot contacts can comprise an electrically conducting material, for example a metal, an alloy, or an electrically conductive organic material, or an electrically conductive embodiment of carbon.

Evaluatable in this connection can mean that it is possible to check, for example, whether the electrical connection between the first control pilot contact and the second control pilot contact exists or does not exist. This check can be prompted, controlled and evaluated by a control unit, for example by attempting to conduct a current over this electrical connection. If this is successful, it may be assumed that the electrical connection exists or, if this is not successful, it may be assumed that the electrical connection does not exist. Since it is known to arrange the respective control pilot contact in the first or second connecting part, a position of the first connecting part or of a section of the first connecting part with respect to the second connecting part can be inferred from the existence or non-existence of the electrical connection. This can be utilized, for example, to determine whether the first and second connecting parts are oriented with respect to one another in such a way that energy can be transmitted, for example while adhering to potential safety requirements.

Evaluatable in this connection can also mean that the electrical connection between the first control pilot contact and the second control pilot contact, if it exists, can be utilized to transmit electrical signals, which represent information, between the first and second connecting parts. It is possible, for example, to transmit a control signal or a signal that contains sensor information, or state information, between the two connecting parts. Such information can be, for example, a charge state, a voltage measurement value, a current measurement value, an identity, authentication information, price information, for short information and/or data that may be of interest for operating the contact unit and/or the equipment connected thereto. So as to be able to transmit such information, each of the control pilot contacts can be connected to a control unit, for example to a first control unit and/or a second control unit, or to a sensor or further, for example, electronic switching modules, wherein the connection can in each case be implemented via an electrical line, for example a twisted pair line. It is conceivable that the first and second control pilot contacts in each case have one or more electrical connecting surfaces at each of which an electrical connection can be established between the first and second control pilot contacts when the first and second control pilot contacts make contact with one another. It is also conceivable for the electrical connections between the first and second control pilot contacts to be used in each case in pairs, for example for transmitting one or more signals. In this way, the first and second control pilot contacts can, for example, also be part of an electrical communication link between the control unit connected to the first control pilot contact and the control unit connected to the second control pilot contact. Instead of the respective control unit, it is also possible to use other electrical or electronic modules of the respective connecting part or of the respective equipment connected thereto, for example a control unit of a vehicle or a control unit of a charging station. In principle, the control pilot contacts can advantageously be used in this respect for control tasks that may occur during the operation of the contact unit.

It is also conceivable that a portion of the functionality of a control pilot contact is provided by a protective ground conductor contact. For example, it is possible for an electrically conducting surface of a protective ground conductor contact to form one of the electrical connecting surfaces of a control pilot contact, or to be encompassed thereby. As a result, it is conceivable for the first protective ground conductor contact to provide an electrically conducting surface for the first control pilot contact, and the second protective ground conductor contact to provide an electrically conducting surface for the second control pilot contact. In such a case, the electrically conducting surface of the protective ground conductor contact could have a smaller surface than is the case with a conventional protective ground conductor contact, which may be intended for providing a ground potential and/or dissipating a fault current. An electrical connection between the first and second control pilot contacts can then also be provided, at least partially, by an electrically conducting connection between the first and second protective ground conductor contacts.

There is the option that the first and second control pilot contacts are arranged between the solenoid and the magnet counter-element. This defined position can make it possible, for example, to infer the position of the at least one section of the first connecting part relative to the second connecting part from a contact between the two control pilot contacts, which can be determined, for example, by determining an electrical connection between the two control pilot contacts. The first control pilot contact can also be provided with an electrically conductive section of the solenoid. The second control pilot contact can be provided with an electrically conductive section of the magnet counter-element.

In one embodiment, the second connecting part can comprise a movable contact protection restoring element provided with a preloading element. It is conceivable, when the first section of the first connecting part is in the idle position, to displace the second section of the first connecting part in the contacting direction relative to the first section in such a way that the first electrical contact and the second electrical contact are spaced apart from one another. The contact protection restoring element can be an element made of an insulating material, for example a non-conducting plastic material. The preloading element can be a spring, for example a helical spring or a disk spring. It is then also possible for the preloading element to be connected to the second connecting part and to the contact protection restoring element. The preloading element can exert a force on the contact protection restoring element so that the same is able to move relative to the second connecting part. It is conceivable that, during this movement, the contact protection restoring element pushes against the second section of the first connecting part and displaces the second section. This displacement can be designed such that the first electrical contact is spaced apart from the second electrical contact as a result of the displacement of the second section.

In a possible interaction with the solenoid, it may be advantageous when the solenoid is in the inactive state during the displacement for spacing the first electrical contact apart from the second electrical contact. It is furthermore possible that the contact restoring element, during the displacement for spacing the first and second electrical contacts apart from one another, is displaced or reaches a position in which the presence of the contact restoring element precludes an electrical connection from being established between the first electrical contact and the second electrical contact. The advantage that can result from such an arrangement is that, for example when the solenoid transitions into an inactive state, the electrical connection between the first and second electrical contacts is disconnected by spacing these apart, and the two contacts are electrically insulated from one another.

In one variant embodiment, it is possible that the second electrical contact is movable. It is also possible for a kinematic coupling to be embodied between the second electrical contact and the contact protection restoring element. It is also conceivable that the kinematic coupling transmits a movement of the contact restoring element to the second electrical contact for providing a contact with a contact force between the first electrical contact and the second electrical contact or for spacing the first electrical contact and the second electrical contact apart from one another. In this way, it is conceivable that the contact restoring element is moved as a result of a movement of the second section of the first connecting part in that the second section pushes against the contact restoring element and displaces the same. As a result of the kinematic coupling, it is possible that the second electrical contact is moved so as to approach the first electrical contact until making contact therewith, and finally a contact force is built up between the first electrical contact and the second electrical contact. This process can be optimized, for example, by combining the kinematic coupling and the preloading element of the contact restoring element in such a way that the preloading element of the contact restoring element can simultaneously act as a preloading element for the second electrical contact.

When the second section of the first connecting part does not push against the contact restoring element, for example when the solenoid is in an inactive state and/or the position of the movement section of the actuator allows a movement of the second section of the first connecting part, the contact restoring element can move, as a result of the force exerted by the preloading element of the contact restoring element, in such a way that the second section of the first connecting part is moved by the contact restoring element, by way of pushing, in such a way that the first electrical contact moves spatially away from the second electrical contact. At the same time, the second electrical contact itself may also be moved as a result of the kinematic coupling, so that the spatial distance between the first and second electrical contacts is also increased as a result.

It is conceivable that the protective ground conductor preloading element and the preloading element of the contact protection restoring element are configured in such a way that the contacting sequence: protective ground conductor contacts, first and second contacts, pilot control contacts is provided when an electrical connection is being established between the first connecting part and the second connecting part. When disconnecting the electrical connection between the first connecting part and the second connecting part, it is possible to adhere to the sequence: control pilot contacts, first and second contacts, protective ground conductor contacts.

In one embodiment, it is possible for the first connecting part to be a plug, and for the second connecting part to be a socket. Alternatively, it is likewise conceivable for the first connecting part to be a socket, and for the second connecting part to be a plug. In this connection, it is possible that the socket guides the plug along the contacting axis. This guidance, which is equivalent to a restriction of possible degrees of freedom in terms of the movement of the plug and socket relative to one another, simplifies the use of the contact unit since no further provisions have to be taken for a movement along the degrees of freedom not enabled as a result of this restriction.

In addition, the option exists for the socket to comprise a movable cover. This cover may be used to protect the electrical contact of the socket against environmental factors. Environmental factors can be, for example, precipitation, such as rain, dew or snow, or dust or other particles, which can occur, in particular, in production facilities. Other relevant environmental factors, however, can also be gases or, for example, salts, which can occur in marine air. Due to a cavity that a socket can typically define and, in general, can at least partially enclose, it may be important for operation to protect the socket, for example, against deposits resulting from the environmental factors or against contact therewith, for example by covering the same with a cover. The cover can, for example, be connected in a folding or displaceable manner to the socket. The movement of the cover can, for example, be carried out by way of a further actuator, for example an electric motor. In principle, however, the option also exists for the cover to be arranged with a preloading element and, for example by pressure exerted by handling by a user, to be pushed into an open position and to be moved back into a closed position with the aid of the force exerted by the preloading element. The cover, however, can also be designed as a lid, which can be manually arranged, for example.

In principle, it is also conceivable for the cavity of the socket to be designed to be rinsable and to be rinsed with a gas. It is possible that an overpressure compared to the ambient pressure is provided, for example when the cavity is substantially closed by the cover.

In one embodiment, the option exists for the first connecting part to be connected to a holding device, which is designed to provide an interface for positioning the first connecting part with respect to the second connecting part. This may be a manual positioning process, for example. It is likewise conceivable for the positioning to be carried out by a machine or supported by a machine and/or supported by a mechanical device. The holding device can comprise a handle, for example, having a rod shape, for example. The holding device can also be spaced apart from the first connecting part, for example with the aid of a spacer. The option also exists for the holding device to be arranged so as to at least partially extend around the first connecting part. For example, the option exists to grip the holding device using one hand, or also using two hands. The holding device can also have an ergonomic structure, for example recesses that are arranged in an undulated manner and that can replicate the impression of fingers of a hand. The holding device can also be implemented by a recess in the first connecting part. Another option is that the holding device is designed as a surface, for example having threaded boreholes, to which a machine or a mechanical device can be coupled, for example by way of a screw connection.

In one embodiment, it is conceivable that the first and/or second connecting parts in each case comprise a holding device, for example in one of the above-described embodiments or, for example, as a snap-fit connector, by way of which the first and second connecting parts can be aligned with one another by a machine or at least supported by a machine and/or supported by a mechanical device. It is then also possible for the first connecting part to be transferred into the idle position by a machine or at least supported by a machine and/or supported by a mechanical device. For this purpose, the first connecting part can be connected to a support arm, for example using the holding device.

It is possible that the support arm is able to carry out both a translatory movement and a rotatory movement, for example in three, four or five or more axes. It is also conceivable that the support arm is moved with the aid of a drive motor. For example, the support arm can also be designed as the arm of a robot. So as to establish a connection between the support arm and the first connecting part, it is conceivable that the first connecting part comprises the holding device, for example includes a surface that, for example, can be a flange surface, to which the support arm can, for example, be screwed or attached. The first connecting part can also include a recess, serving as the holding device, in which a matching counter-piece of the support arm can be engaged. A connection between the support arm and the first connecting part can also be producible by way of a snap-fit closure or a bayonet closure, serving as the holding device. It is also conceivable that the support arm comprises a grip mechanism and grips and guides the first connecting part, for example at the handle.

For controlling the machine-based and/or machine-supported alignment of the first and second connecting parts with respect to one another, it is possible for a positioning control unit to be provided, which controls the movement of the support arm, for example in that a motor driving a movement of the support arm is supplied with suitable signals. It is also conceivable that the positioning control unit is supplied with a signal of a sensor, which is indicative of the alignment of the first connecting part relative to the second connecting part. Such a sensor can be an optical sensor, for example, such as a camera, or a combination of a light source and a light sensor, or a distance sensor, such as an eddy current sensor, or a Hall sensor comprising a magnet located opposite thereof, or a pressure wave-based or radio wave-based localization device. It is also conceivable that the first and/or second connecting parts are provided with a spatially delimited marking, wherein the marking can be distinguished from the surrounding area thereof, for example in terms of color, structure, surface, material, or a combination thereof, or, for example, can also be implemented as a protrusion, an edge or a recess, or a combination thereof.

It is furthermore possible for the first connecting part, for example the electrical conductor arranged in the first connecting part, to be electrically connected to an electrical energy source, and for the second connecting part, for example the electrical conductor arranged in the second connecting part, to be electrically connected to an electrical energy sink, for example a chargeable electrical energy store. As an alternative, it is possible for the first connecting part, for example the electrical conductor arranged in the first connecting part, to be electrically connected to the electrical energy sink, for example a chargeable electrical energy store, and for the second connecting part, for example the electrical conductor arranged in the second connecting part, to be electrically connected to an electrical energy source. The electrical energy source can, for example, be the electric supply network, which, in turn, itself can comprise a further electrical energy source, for example a power plant. The energy source, however, can also be an energy store, for example a storage battery or a chargeable energy store, which can also be rechargeable. For example, this may be a lithium-ion rechargeable battery or a super capacitor (supercap) or a carbon-based energy store, for example graphene-based. The chargeable electrical energy store can, for example a storage battery or a chargeable energy store, which can also be rechargeable. For example, this may be a lithium-ion rechargeable battery or a super capacitor (supercap) or a carbon-based energy store, for example graphene-based. When the first electrical contact and the second electrical contact make contact with one another, so that an electrical connection is established between the first and second electrical contacts, an electrical connection between the electrical energy source and the electrical energy sink, for example the electrically chargeable energy store, can be established via the electrical conductor in the first connecting part, the first electrical contact, the second electrical contact, and the electrical conductors in the second connecting part, so that electrical energy can be transported from the energy source to the energy sink. It is also possible for electrical energy in the form of electrical current to be conducted from the energy store, which then serves as an energy source, into the supply network, which then represents an energy sink, through the contact unit, for example for stabilizing the electrical supply network or a portion of the electrical supply network and/or, generally speaking, for providing a power of the energy store expedient for the network. For this purpose, the supply network can be electrically connected, for example, to the first electrical contact, and the energy store can be electrically connected to the second electrical contact. It is likewise conceivable that, for example, the electrical supply network is electrically connected to the second electrical contact, and the energy store is electrically connected to the first electrical contact.

In one embodiment, it is possible for the first and/or second connecting parts to have temperature conditioning. The temperature conditioning unit may set a temperature of the first and/or second connecting parts to a temperature of less than 120° C., preferably 90° C., and particularly preferably 60° C.

A temperature sensor may be used to detect the temperature of the first and/or second connecting parts. It is possible, for example, to arrange the temperature sensor at or close to the first and/or second electrical contacts.

Temperature conditioning is possible, for example, by way of flowing air, which can take up heat generated in the contact unit and dissipate it into the surrounding area. Flowing air can be provided by way of a blower or compressor, for example, which blows flowing air into the first and/or second connecting parts, for example into air inlet openings provided for this purpose. It is likewise conceivable that the flowing air is provided from a reservoir, for example a pressure vessel, with a pressure at the air inlet openings so that the flowing air can flow into the air inlet openings. It is furthermore possible that, proceeding from the air inlet openings, the flowing air is conducted in the contact unit with the aid of an air guidance channel in the contact unit, for example in the first connecting part. It is likewise possible that the flowing air is spatially distributed by way of an air distributor in the contact unit. It may be advantageous when the flowing air reaches the first electrical contact and/or the second electrical contact in a spatially evenly distributed manner. The temperature conditioning may be further enhanced when the flowing air itself is conditioned to a predefined temperature, for example 20'C, or to an ambient temperature, which can be detected in the surrounding area of the contact unit using a further temperature sensor. However, the option also exists for thermal energy to be removed from the contact unit, for example with the aid of a coolant, which may flow in a coolant channel arranged around the first and/or second electrical contacts. Water, for example, may be used as the coolant. So as to determine the amount of air to be provided for cooling and/or cooling medium to be provided within a time period and to provide it based thereon, a signal of a sensor, for example of a temperature sensor, may have to be evaluated.

One advantage that arises from the temperature conditioning, and in particular from cooling of the contact unit, is that a temperature-dependent ohmic resistance, for example in the first and/or second electrical contacts or in an electrical conductor, may be maintained below a predefined maximum value. Since an electric power loss generated within the contact unit is associated with the ohmic resistance, the power loss and a heat generation associated therewith in the contact unit may thus also be limited. Moreover, it is possible that materials used in the contact unit, for example when these are used in an insulation system, are only permitted to be used at temperatures in a predefined range so as to be able to ensure a predefined insulating function and usage duration. Temperature conditioning may also be used to adhere to such a temperature range.

In one embodiment, the option exists that the contact unit comprises a control unit. It is conceivable for the control unit to provide a control signal for establishing and/or releasing an electrical connection between the first connecting part and the second connecting part. Such a control signal may, for example, relate to the actuator, for example so as to move the movement section relative to the fixation section. It is possible, for example, for the control unit to process a signal that is indicative of a position of the movement section relative to the fixation section. Such a signal can, for example, be provided by a sensor, such as an optical sensor, a magnetic sensor, an eddy current sensor, or a limit switch, which may carry out a sensory function here. It is also possible for the control unit to process a signal, which is indicative of whether the first connecting part is in the idle position with respect to the second connecting part.

In addition, a control signal regarding the solenoid is conceivable, for example so as to transfer the solenoid into an active or inactive state. This may take place, for example, by accordingly switching on or off an electrical current source, which can provide electrical current for the coil winding of the solenoid. The control signal regarding the solenoid can, for example, also be implemented as a function of a signal that is indicative of a position of the movement section relative to the fixation section. However, this may also be made dependent on whether, for example, the first control pilot contact and the second control pilot contact are in contact with one another.

The control unit can, for example, be designed as a microcontroller, which comprises a processing unit and a memory, and additionally includes a suitable interface, which can be used to receive and send signals, for example the aforementioned control signals and/or sensor signals. The function of the control unit can, for example, be determined by a control program stored in the memory. Moreover, it is also conceivable, for example, that a functionality of the control unit is implemented, while incorporating a field programmable gate array (FPGA), wherein a configuration of the FPGA determining the functionality can be stored in a memory connected thereto.

The control unit may also carry out the task of charge state monitoring, for example in such a way that, when a storage battery to be charged is fully charged, for example, the flow of current is terminated, and the electrical connection between the first and second connecting parts is disconnected. Further administrative functions, such as time and cost capturing, data acquisition, identity checking, communicating, for example with a central equipment control unit or a server, alarm functions, error recognition, temperature monitoring, and cooling control are likewise functions that may potentially be implemented by the control unit. It may be necessary for this purpose for further sensors to be installed in the contact unit, for example a temperature sensor and/or a time sensor, and for signals, which are generated by the further sensors, to be received by the control unit and processed.

The control unit can furthermore provide a functionality that controls an optional user interface and by which a user is provided with an option of operating action. Such a user interface can, for example, be a display element, such as a display or a light-emitting diode, and/or switches, push buttons or keys, a touch pad or other conceivable input devices, by way of which the user can operate the contact unit.

In one embodiment, the option exists that the contact unit has reverse polarity protection. Reverse polarity protection shall be understood to mean that, by means of a design measure and/or an implemented checking procedure, the first connecting part and the second connecting part are prevented from being arbitrarily oriented with respect to one another, in particular when the first and second electrical contacts are in contact with one another and/or are situated in the immediate vicinity of one another, for example while an electrically conducting connection is being established between the first electrical contact and the second electrical contact and/or while an electrically conducting connection between the first electrical contact and the second electrical contact is being disconnected.

The reverse polarity protection is designed to limit a plurality of possible electrical connection configurations between the first electrical contact and the second electrical contact and/or between the first protective ground conductor contact and the second protective ground conductor contact and/or between the first pilot control contact and the second control pilot contact to a predefined number, for example to exactly one possible connection configuration or, for example, exactly two possible connection configurations. A reverse polarity protection has the advantage that, for example in the case of electrical connections in which a direct current and/or a direct voltage is used, no electrical connections that are not intended can occur, which in such a case may result in a fault current and/or in damage to the contact unit and/or connected components, or even in injury of a user.

In one embodiment, such reverse polarity protection is conceivable in which, for example, the first connecting part, at least in one section, has an outer shape that substantially complements an outer complementary shape of at least one section of the second connecting part, wherein the shape and complementary shape are designed to be engaged with one another and, as a result of the engagement, to predefine the arrangement of the first connecting part with respect to the second connecting part.

Another option for the design of the reverse polarity protection is, for example, to arrange the first electrical contact and the second electrical contact at the first or second connecting part in each case in such a way that the first electrical contact and second electrical contact, for example, can make contact with one another only, and in the predefined connection configuration, when the first and second connecting parts are oriented with respect to one another in an appropriate manner, for example in that an arrangement of the respective contacts that is asymmetrical with respect to the contacting axis is selected. In addition or as an alternative, this manner of arranging the contacts may analogously may also be provided using the first and second protective ground conductor contacts and/or first and second control pilot contact.

For example, the option then exists that a check is carried out, when the first protective ground conductor contact and the second protective ground conductor contact are in contact with one another, for example with the aid of a control program stored in the control unit, as to whether and/or which electrical connections exist between the first protective ground conductor contact and the second protective ground conductor contact, for example by detecting and evaluating a possible electrical current flow between the first and second protective ground conductor contacts. In addition or as an alternative, such a check may analogously also be carried out using the first and second electrical contacts and/or the first and second control pilot contacts. Based on the result of the check, a decision can be made, for example, as to whether an energy transmission can take place by the contact unit or not.

A use of the contact unit is possible, for example, when recharging a storage battery of a battery-electric vehicle.

In addition, a method for operating a contact unit is disclosed. The method may also relate to the establishment of a high current connection for recharging a storage battery of a battery-electric vehicle. For example, the method can be carried out using an above-described contact unit. The features described with respect to the contact unit can, in this regard, also be applied to the method, and vice versa, the features of the method can be applied to the contact unit.

The disclosed method comprises the following steps:

arranging a first connecting part including a first electrical contact and a second connecting part including a second electrical contact so that the first connecting part and the second connecting part can be moved with respect to one another along a contacting axis extending in a contacting direction, the first connecting part being positionable with respect to the second connecting part along the contacting axis in such a way that a first section of the first connecting part ends up in an idle position with respect to the second connecting part;

positioning a first section of the first connecting part relative to the second connecting part in the idle position; and displacing a second section of the first connecting part in the contacting direction relative to the first section so that the second section of the first connecting part and the second connecting part rest against one another in the contacting direction, and the first electrical contact and the second electrical contact are in contact with one another.

The disclosed method can furthermore comprise one or more of the following steps:

moving a latching element into a latching position;

moving a latching element into an unlatching position;

activating a solenoid; and deactivating a solenoid.

The disclosed method can furthermore also comprise one or more of the following steps:

moving the second electrical contact by moving a contact protection restoring element kinematically coupled therewith;

providing a contact force between the first and second electrical contacts;

opening a cover; and closing a cover.

Likewise, one or more of the following steps can be part of the method:

connecting the first connecting part to an energy source;

connecting the second connecting part to an energy source;

connecting the first connecting part to an energy store; and connecting the second connecting part to an energy store.

Further potential method steps include:

conditioning the temperature of the contact unit;

providing a control signal;

processing a sensor signal;

providing a communication signal; and processing a communication signal.

One possible application of the electrical contact unit is to establish an electrically conducting connection, or an electrical connection for short. The electrical connection can be used to conduct an electrical current. The electrical connection can be a high current connection, wherein the high current connection includes the possibility to conduct a high electrical current.

The electrical contact unit can be used to establish an electrical connection between an electrical energy source and an electrical energy storage battery, storage battery for short. The storage battery is designed to store electrical energy. The storage battery can be rechargeable. The storage battery can provide energy for a vehicle. The vehicle can be a battery-electric vehicle. This means that the vehicle or components of the vehicle can be operated using energy provided by the storage battery.

The vehicle encompasses motor-operated means of transportation on land, on the water and in the air as well as in space, for example cars, ships or aircraft as well as spacecraft. These can also be motor-operated equipment geared toward movement, for example, which can be found in some industrial plants, for example crane systems, conveyor belts or other industrial transport systems. It is conceivable that a vehicle is operated using human interaction, but also without human interaction, that is, autonomously, or is controlled by a control unit.

The electrical contact unit can furthermore also be used in equipment that is not primarily geared toward locomotion, for example on an electrical energy store, which, however, can be provided for both stationary and mobile operation. A use without energy store is likewise conceivable, wherein it may be important in the case of such a use to establish a connection between an electrical energy source and an electrical energy sink.

However, it is preferred to use the electrical contact unit for establishing a high current connection. The high current connection can, for example, be used to recharge a storage battery of a battery-electric vehicle.

BRIEF DESCRIPTION OF THE DRAWINGS

Exemplary embodiments will be shown and described hereafter based on figures. In the drawings:

FIGS. 2*a* to 2*d*: each show a schematic illustration of a first connecting part designed as a plug;

FIGS. 4*a* to 4*d*: each show a schematic illustration of the first and second connecting parts in different positions with respect to one another;

DETAILED DESCRIPTION

Figure 1:
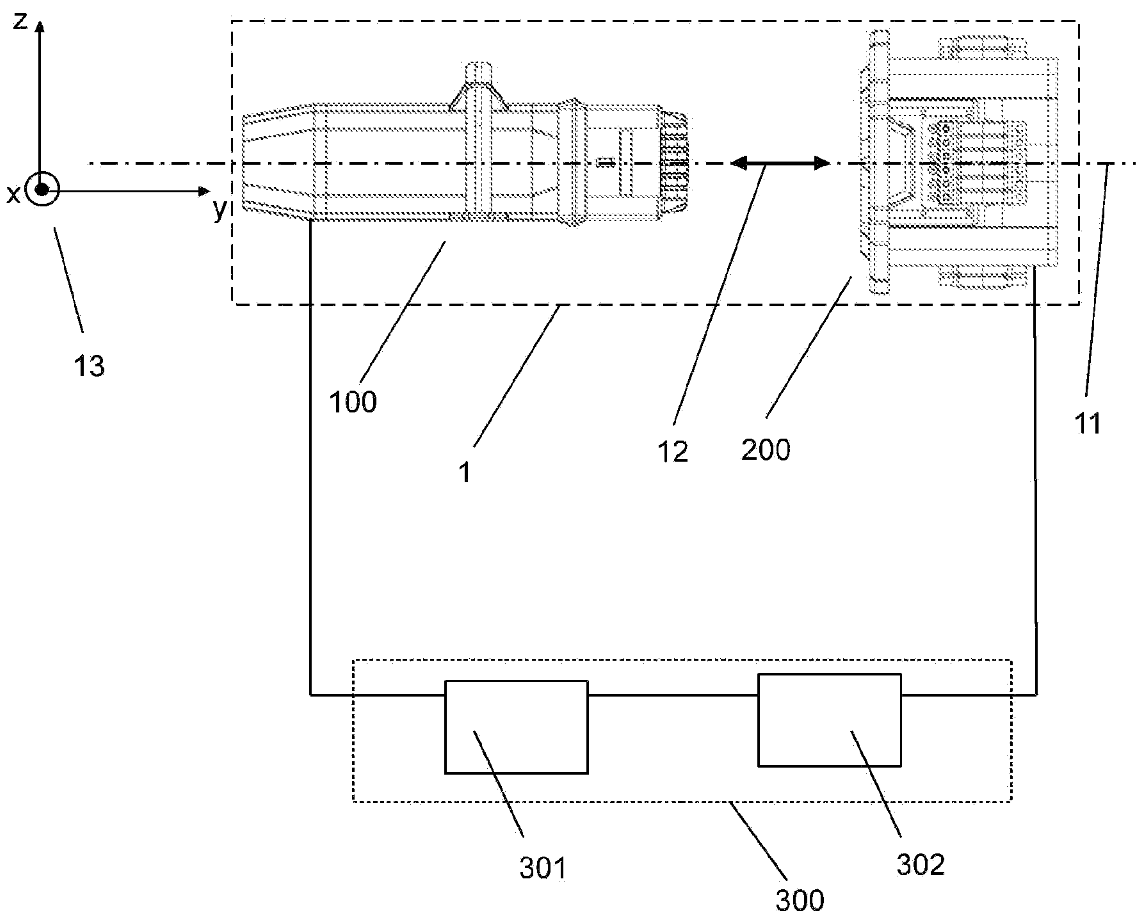
FIG. 1: shows a schematic illustration of the contact unit.

Recurring elements in the figures are denoted by identical reference numerals and are partially dispensed with, in particular when no reference is made to these elements with respect to a particular drawing. Furthermore, it shall be understood that the shown exemplary embodiments only represent options for implementing the disclosed inventive idea and in no way have any limiting effect. All illustrations only include schematic representations, even if this is not always explicitly pointed out. Details that are not addressed within the scope of the description can be dispensed with in individual illustrations. The figures additionally only encompass illustrations of which it is assumed that the first connecting part is a plug, and the second connecting part is a socket. The shown principles, however, can also be applied analogously to the case where the first connecting part is a socket, and the second connecting part is a plug.

FIG. 1 shows a contact unit 1. The contact unit comprises a first connecting part 100 and a second connecting part 200. The two connecting parts 100, 200 are arranged at a contacting axis 11 and aligned therewith so as to be displaceable relative to one another in a contacting direction 12, which extends toward the contacting axis 11. In FIG. 1, the first connecting part 100 is arranged with respect to the contacting axis 11 in such a way that the contacting axis 11 extends through a central point of the first connecting part 100. Likewise, the second connecting part 200 is arranged with respect to the contacting axis 11 in such a way that the contacting axis 11 extends through a central point of the second connecting part 200.

FIG. 1 furthermore shows a Cartesian coordinate system 13, which has a respective coordinate axis in an x direction, a y direction and a z direction, wherein the coordinate axis in the y direction is oriented parallel to the contacting axis 11. During the operation of the contact unit 1, the first connecting part 100 can be inserted at least partially into the second connecting part 200, wherein the displacement direction during insertion corresponds to the positive y direction. The first connecting part 100 is accordingly separated from the second connecting part 200 by displacing the first connecting part 100 relative to the second connecting part 200 in the negative y direction. The first connecting part 100 can be displaced relative to the second connecting part 200 by moving the first connecting part 100 and/or the second connecting part 200.

FIG. 1 furthermore shows a control unit 300. The control unit 300 can, for example, be a microcontroller, a programmable logic controller, a computer, an FPGA or an electronic circuit. The control unit 300 can be designed as one control unit 300. However, the option also exists for the control unit 300 to comprise, for example, as is illustrated in FIG. 1, multiple control units, for example a first control unit 301 and a second control unit 302. The first control unit 301 and the second control unit 302 can be connected so as to communicate, for example can be electrically connected to one another. In the example shown in FIG. 1, the first control unit 301 can be in communicating connection with the first connecting part 100. For this purpose, the control unit can be arranged outside, but also inside the first connecting part 100. For example, the first control unit 301 can be designed as a control unit of a charging station. In the example shown in FIG. 1, the second control unit 302 can be in communicating connection with the second connecting part 200. For this purpose, the control unit can be arranged outside, but also inside the second connecting part 200. For example, the second control unit 302 can be designed as a control device of a vehicle. The communication between the first control unit 301 and the second control unit 302 can, for example, be established via an electrical connection, which encompasses an electrical connection established via a first control pilot contact 123 and a second control pilot contact 213. It is also possible for the first control unit 301 and the second control unit 302 to communicate via a radio link with one another. It is furthermore conceivable that the first and second control units 301, 302 can carry out tasks independently of one another.

The control unit 300 can be used to output control signals to the first connecting part 100 and/or second connecting part 200, for example for activating an actuator drive 141 (not shown in FIG. 1), or to receive signals, for example a switching signal of an operating element 126 (not shown in FIG. 1), which can, for example, be a switch, a push button or a touch pad, or a sensor signal, for example of a limit sensor, such as, for example, of a micro push button, of a Hall sensor or of a distance sensor. Other signals can relate to a position of the actuator drive 141, but also to a temperature, for example in the surrounding area of the contact unit 1 and/or within the contact unit 1. Signals may be signals transmitted with the aid of the control pilot contacts 123, 223 (not illustrated in FIG. 1). The control unit 300 can provide a user interface via which the control unit 1 can be operated. The control unit may also be used to control and to monitor a charging process, for example as to whether operating limits, for example regarding the temperature or a current intensity, are being adhered to. Using the control unit, an operation of the contact unit 1 can be automated, for example by carrying out a method for operating the contact unit 1, serving as a program, in the control unit 300. Such a method can, for example, comprise one or more steps, such as, for example: evaluating a sensor signal, providing a control signal for the actuator drive 141, activating a solenoid 124, deactivating the solenoid 124, connecting the first connecting part 100 to an energy source, connecting the second connecting part 200 to an energy source, connecting the first connecting part 100 to an energy store, connecting the second connecting part 200 to an energy store, opening a cover, closing a cover, providing a communication signal, and processing a communication signal. The control unit 300 can furthermore comprise an interface for the communication. It is conceivable that the control unit 300 receives data and/or control signals via the interface for the communication. In this way, it is also possible for the control unit 300 to be designed to the remote-controllable. It is also possible for the program of the control unit 300 to be modified via the interface for the communication.

FIGS. 2*a* to 2*d* each show a schematic illustration of a first connecting part 100 designed as a plug 100.

Figure 2:
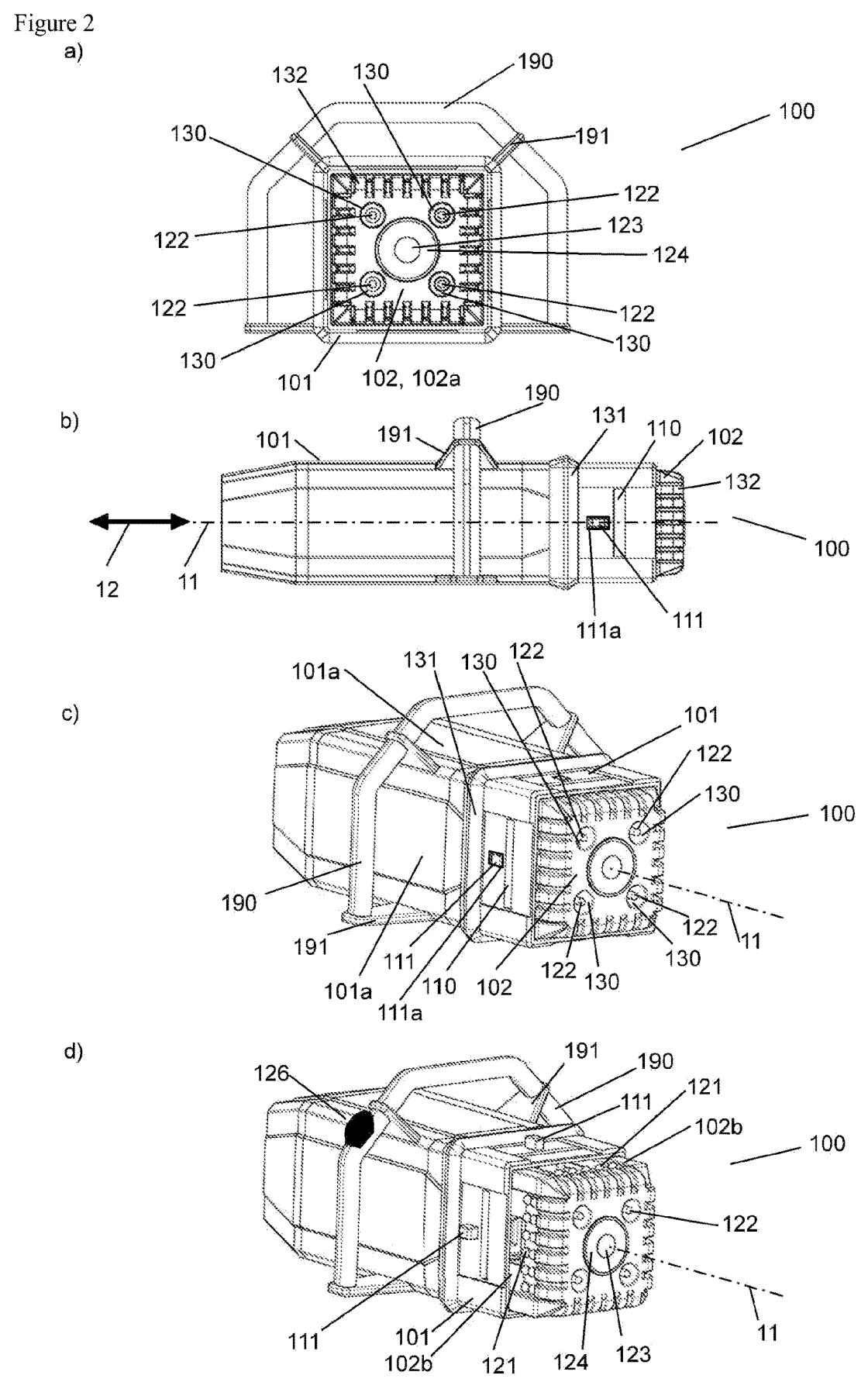

The first connecting part 100 in FIG. 2*a* comprises a first section 101 and a second section 102. In particular, a surface 102*a* of the second section 102 is visible in this illustration, which represents an end face 102*a* of the second section 102 and is oriented substantially perpendicular to a contacting direction 12. First protective ground conductor contacts 122, a solenoid 124 and the first pilot control contact 123 are arranged at this end face 102*a*. The end face 102*a* has recesses 130 from which the first protective ground conductor contacts 122 protrude, for example, perpendicular to the end face 102*a*. In this example, the first protective ground conductor contacts 122 have a substantially cylindrical shape. Furthermore, protrusions 132 are visible, behind which (concealed in this figure by the protrusions 132) a first electrical contact 121 is arranged. As a result, direct contact with the first electrical contact 121 is made more difficult. The second section 102 is configured so as to be at least partially surrounded by the first section 101 at surfaces which are not the end face 102*a*, movable within the first section 101 and furthermore shaped in such a way that the first section 101 can guide the second section 102 during a movement in the contacting direction 12.

Furthermore, a holding device 190 is apparent in FIG. 2*a*, which is attached to the first section 101 with the aid of multiple spacers 191. The holding device 190 has a rod shape in some sections and is designed so as to at least partially surround the first section 101. This design is advantageous since a rod shape can be gripped by a human hand, whereby simple handling of the first connecting part 100 is made possible. The ability to grip the holding device 190 is supported in that a space is formed between the first section 101 and the holding device 190 as a result of the use of spacers 191, which create a substantially rigid connection between the holding device 190 and the first section 101. On the other hand, it is also clear that, in other embodiments, a holding device 190 can be implemented in another manner, for example by a recess in the first section 101.

FIG. 2*b* shows the first connecting part 100 of FIG. 2*a* in a side view. The contacting axis 11 extending along the contacting direction 12 is apparent. Moreover, a stop edge 131, a latching element 111 and a locking recess 110 are shown. The stop edge 131, the latching element 111, the latching recess 111*a* and the locking recess 110 are designed so as to predefine a positioning of the first connecting part 100 in relation to the second connecting part 200. The stop edge 131 can also serve as a sealing element. For example, the stop edge can be made of a sealing material, such as rubber. In this figure, the second section 102 is at least partially enclosed by the first section 101 in such a way that the end face 102*a* is located outside the region enclosed by the first section 101. In this illustration, the second section 102 is in a position in which the first electrical contact 121, which is arranged at the second section 102, is concealed by the first section 101, whereby manual contact with the first electrical contact 121 by a potential user is at least made more difficult. In the illustrated embodiment, the first protective ground conductor contacts 122 do not protrude beyond the end face 102*a* of the second section 102.

FIG. 2*c* shows an isometric illustration of the first connecting part 100 from FIGS. 2*a* and 2*b*. Multiple side surfaces 101*a* of the first section 101 are visible, and it can be seen that the latching recess 111*a* for a latching element 111 and a locking recess 110 are in each case arranged at each of the side surfaces 101*a*. In this illustration, the second section 102 is in a locking position, in which a movement of the second section 102 with respect to the first section 101 prevented. In the locking position, for example, a movement of the first connecting part 100 is possible, without the first section 101 and the second section 102 undesirably moving with respect to one another and creating a situation, for example, in which the first section 101 does not conceal the first electrical contact 121.

FIG. 2*d* shows the isometric illustration of the first connecting part 100 from FIG. 2*c* in a situation in which the second section 102 is not in the locking position, but in an unlocking position. The second section 102 protrudes beyond the first section 101 in such a way that the first electrical contact 121 is not concealed by the first section 101. The first electrical contact 121 is arranged at each of the side surfaces 102*b* of the second section 102. The first electrical contact 121 has an extended shape, but not necessarily, having a rectangular base surface and protuberance-shaped protrusions, wherein the protuberance-shaped protrusions, at one end, have a curved shaped, for example in the form of a hemisphere. This curvature allows a contacting process during which better sliding is possible, compared to a more angular shape. In addition, it is possible to better predict and reproduce the quality of an electrical connection that can be established with this contact. For establishing an electrical connection, the first electrical contact 121 comprises an electrically conductive material, for example copper, aluminum, a carbon-based electrical conductor, a metal alloy or the like.

FIG. 2*d* shows the latching element 111 in a latching position. It is also apparent that the latching element 111 is arranged at each of the side surfaces 101*a* of the first section 101 or the side surfaces 102*b* of the second section 102. In this way, uniform latching is possible, and consequently also, associated therewith, a uniform distribution of a force at the first connecting part 100, which can be necessary for holding the first connecting part 100 in a position. In addition to the above figures, FIG. 2*d* shows an operating element 126, for example a switch or a push button, by way of which operating actions can be carried out, for example to initiate the establishment of an electrical connection between the first connecting part 100 and the second connecting part 200. This operating element 126 can, for example, be attached to the holding device 190. As an alternative or at the same time, the operating element 126 can also be attached in a different suitable position to the first and/or second connecting parts 100, 200, or to an operating unit, which is not shown here, or a control unit, by way of which automated operating actions and/or switching actions may also be possible.

FIGS. 3*a* to 3*f* show schematic illustrations of a second connecting part 200 designed as a socket 200. The second connecting part 200 can be designed so as to be able to cooperate with the first connecting part 100 in FIGS. 2*a* to 2*d*. The first connecting part 100 and the second connecting part 200 can then be configured so as to have shapes that at least partially complement one another and, for example, in such a way that the first connecting part 100 can be at least partially displaced into a cavity 203 defined by the second connecting part 200, or be displaced out of the same. It is then possible for the first connecting part 100 to be guided during displacement by a boundary of the second connecting part 200.

Figure 3:
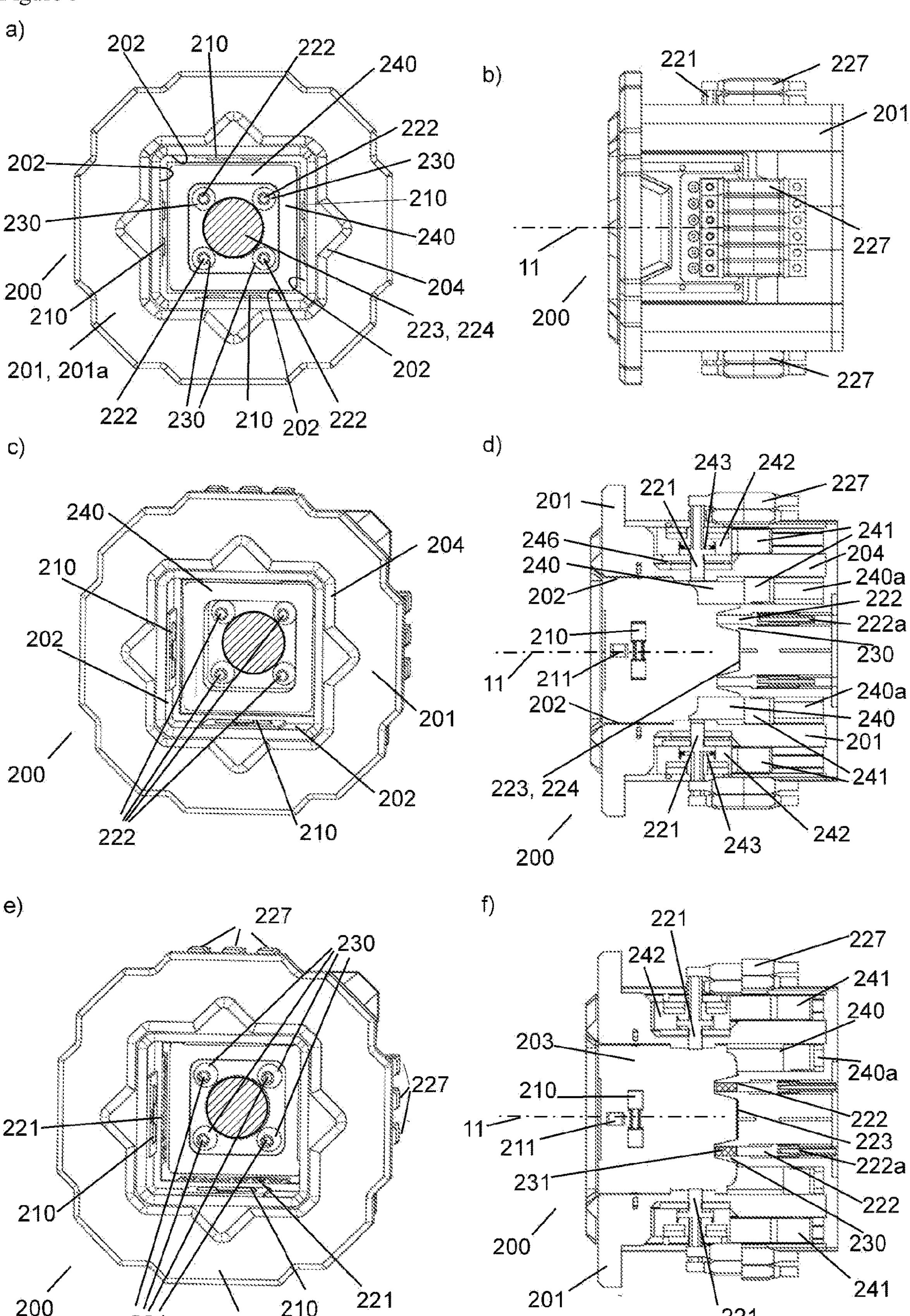
FIGS. 3*a* to 3*f*: each show a schematic illustration of a second connecting part designed as a socket.

FIG. 3*a* shows the second connecting part 200 in a front view. An end face 201*a* on which a sealing element 204 is arranged is visible. Furthermore, four side surfaces 202 of the second connecting part 200 are shown, and an inner delimitation is visible, which encompasses surfaces of a contact restoring element 240 and of a magnet counter-element 224. The end face 201*a* and the inner delimitation are oriented substantially perpendicular to the contacting axis 11 (not shown in FIG. 3*a*), which extends in the contacting direction 12 (not shown in FIG. 3*a*). The side surfaces 202 are arranged so as to extend substantially parallel to the contacting axis 11. In an alternative embodiment, an arrangement of the side surfaces 202 in which opposing side surfaces 202 are not oriented parallel to one another, but, for example, extend conically toward one another, would also be conceivable. The side surfaces 101*a* of the first section 101 of the first connecting part 100 and/or the side surfaces 102*b* of the second section 102 of the first connecting part 100 can be oriented substantially parallel to the side surfaces 202 of the second connecting part. In this way, a cooperation of the first and second connecting parts 100, 200 can be made possible.

The plane of the end face 201*a*, the inner delimitation and the side surfaces 202 of the second connecting part define the cavity 203 of the second connecting part. In the illustrated form, this cavity 203 has a substantially cuboid design, which can also be regarded as a cylindrical design having a square or, generally speaking, rectangular base surface. It is also conceivable for the cavity 203 to have a cylindrical design in which the base surface is not rectangular. For example, a base surface having three or five or more corners, which may also be rounded or chamfered, or, for example, a non-rectilinear delimitation of the base surface is conceivable. The side surfaces 202 of the second connecting part 200 must then be adapted, in terms of the geometric shape thereof, to the base surface in such a way that a corresponding cylindrical design results. Beyond the cylindrical shape, for example conical tapering of the cavity 203 along the contacting axis 11 is also conceivable. The first connecting part 100 can then also have a design that deviates from the shape illustrated in FIGS. 2*a* to 2*d* insofar as the surfaces 101*a*, 102*b* thereof are adapted, in terms of the dimension and orientation, to the cavity 203 of the second connecting part that the first connecting part 100 can be at least partially inserted into the cavity 203 of the second connecting part 200.

Additionally. FIG. 3*a* shows second protective ground conductor contacts 222 arranged at the inner delimitation, each of which is positioned at a protrusion 230. The illustrated protrusions 230 can be oriented so as to be situated opposite the recesses 130 of the first connecting part 100 when the first connecting part 100 has been inserted into the cavity 203 of the second connecting part 200 and so as to be able to be brought into engagement therewith. The recesses 130 of the first connecting part 100 and the protrusions 230 of the second connecting part 200 may complement one another. In addition, a magnet counter-element 224 is shown in FIG. 2*a*, here in the form of a magnet counter-plate 224 made of a magnetic or magnetizable material, such as iron. Here, the magnet counter-plate 224 has the shape of a circular cylinder, wherein a different cylinder base surface is also conceivable, such as a polygon shape or a differently shaped base surface. The second control pilot contact can be arranged at the magnet counter-element. Moreover, locking elements 210 are indicated, which are arranged at the side surfaces 202.

FIG. 3b shows the second connecting part from FIG. 3a in a side view. FIG. 3b includes an illustration of the second electrical contact 221 arranged around the cavity 203, which is not visible in this illustration. Furthermore, the basic structure 201 of the second connecting part 200 is visible in this illustration. This may be used to at least partially delimit the second connecting part 200 with respect to the surrounding area. This delimitation can be used both for providing electrical insulation between the surrounding area of the electrically conducting component of the second connecting part 200, for example the second electrical contact 221, and for protecting the second connecting part 200 against moisture and/or other environmental factors, such as dust, vapors or undesirable mechanical forces. The basic structure 201 is also used to attach the second connecting part 200 to surrounding vehicle parts or equipment components and/or serves as a central support component so as to attach further components of the second connecting part 200 thereto. In addition, FIG. 3b shows the contacting axis 11 in an orientation with respect to the second connecting part 200 in which it is possible to bring the same together with the first connecting part 100. Moreover, FIG. 3b shows the arrangement of an electrical conductor 227, which is connected to the second electrical contact 221. The electrical conductor 227 is designed to conduct large electrical currents, for example up to 1600 A, preferably 1900 A, and particularly preferably 3000 A. An electrical connection that is able to conduct such a current can be a high current connection, or can be referred to as a high current connection, for example or in particular without any time restriction. The electrical connection that can be established by the first electrical contact 121 making contact with the second electrical contact 221 can be a high current connection. Furthermore, an electrical connection can be established between the second electrical contact 221 and, for example, an electrical energy store (not shown) using the electrical conductor 227. The electrical current can be a direct current, for example. However, an alternating current is also conceivable.

FIG. 3c shows the second connecting part 200 illustrated in FIGS. 3a and 3b in a slightly perspective illustration. The second connecting part 200 can be seen in a state in which the first connecting part 100 is either not inserted into the second connecting part 200 or is in the resting position. In this state, the second electrical contact 221 (not visible in FIG. 3c) is concealed by the contact restoring element 240. Manual contact with the second electrical contact 221, for example by a user, is therefore at least made more difficult in this state.

FIG. 3d shows the second connecting part 200 from FIG. 3c in a side perspective view. Illustrated are the second protective ground conductor contacts 222, which are arranged in boreholes 231 of the protrusions 230 that are provided for this purpose and have a conical shape. The second protective ground conductor contacts 222 are movably arranged and can be pushed away from the cavity 203 of the second connecting part 200 against a preloading element 222a, for example a mechanical spring, of the second protective ground conductor contact 222. The pushing-away can, for example, be implemented with the first protective ground conductor contacts 122 of the first connecting part 100 which protrude from the recesses 130. The preloading element 222a of the second protective ground conductor contact 222 is designed to exert a force, which is directed toward the cavity 203 of the second connecting part 200, for example a spring force that depends on how much a spring is pushed together, on the second protective ground conductor contact 222. With the aid of the preloading force, a position of the second protective ground conductor contact 222 can be adjusted, in particular when the first connecting part 100 is not, or is at least only partially, located in the second connecting part 200 or is in the resting position. FIG. 3d shows such a position in which the second protective ground conductor contact 222 ends flush with the protrusion 230.

It is likewise apparent that the contact restoring element 240 spatially separates the second electrical contact 221 from the cavity 203. On the side facing the cavity 203, the contact restoring element 240 is shaped so as to be able to make contact with the second section 102 of the first connecting part 100 across a large surface area and thereby exert a displacement force on the second section 102. This displacement force can be provided by a preloading element 240a of the contact restoring element 240, wherein the preloading element 240a can likewise be a mechanical spring, which in FIG. 3d is arranged on the side of the contact restoring element 240 which faces away from the cavity 203.

The contact restoring element 240 is additionally kinematically coupled to the second electrical contact 221, wherein the kinematic coupling comprises a connecting element 241 that is rigidly connected to the contact restoring element and a displacement element 242 that is movable perpendicular to the contacting direction 12. The displacement element 242 is furthermore connected to the second electrical contact 221, which in FIG. 3d is arranged at the displacement element 242 so as to be movable by way of an elastic element 243, which in this case is a disk spring. The second electrical contact 221 is connected to the electrical conductor 227, which may be flexible and, for example, is designed as a strand. The second electrical contact 221 can be a power contact, which is designed to conduct high power and/or currents, for example up to 1600 A, preferably 1900, and particularly preferably up to 3000 A.

The coupling between the rigid connecting piece 241 and the movable displacement element 242 can be carried out by way of a rolling bearing 244 (not illustrated here), which is arranged in a guide groove 245 (not illustrated here) of the displacement element 242 and is connected to the connecting element 241, for example a ball bearing 244. In principle, a guide pin in the guide groove 245 would also be conceivable instead of the rolling bearing 244. However, a rolling bearing 244 offers the advantage of enhanced movability and lower friction. In addition, the movable displacement element 242 is limited to a movement perpendicular to the contacting axis 11 by way of a guide cylinder 246 that is displaceable in a guide borehole.

FIG. 3d furthermore shows a recess 211 that can be brought into engagement with the latching element 111 of the first connecting part 100 so that the latching element 111 is in a latching position, and a movement of the first section 101 of the first connecting part 100 with respect to the second connecting part 200 is prevented. Moreover, FIG. 3d shows the locking element 210, which here has a shape divided into three cylindrical sections that are connected to one another and is elastically (not visible) attached to the second connecting part 200 in such a way that the locking element 210, during insertion of the first connecting part 100 into the cavity 203 of the second connecting part 200, is moved so as to essentially not protrude from the particular side wall 202, except when engaged with the locking recess 110 of the first connecting part 100.

FIG. 3*e* illustrates the second connecting part 200 from FIGS. 3*a* to 3*d* in a state in which the second electrical contact 221 protrudes into the cavity 203 from the respective side wall 202, and thus is visible in the illustration. The locking elements 210 are likewise visible, which in this state protrude from the particular side wall 202 into the cavity 203 of the second connecting part.

FIG. 3*f* shows the second connecting part 200 from FIG. 3*e* in a side illustration, which is similar to the illustration in FIG. 3*d*. In contrast to FIG. 3*d*, the second connecting part 200 can be seen in a state in which the second section 102 of the first connecting part 100 (not shown in the figure) has been inserted into the cavity 203 of the second connecting part 200 up to an end position. In this state, the contact restoring element 240 is displaced in a direction pointing away from the cavity 203, so that the second electrical contact 221 is not concealed by the contact restoring element 240. The connecting element 241 is displaced in the contacting direction by way of the contact restoring element 240. By way of the coupled movable displacement element 242, the second electrical contact 221 is also displaced perpendicular to the contacting direction 12 in such a way that an end of the second electrical contact 221 which faces the cavity 203 protrudes into the cavity 203. The second protective ground conductor contacts 222 are likewise displaced. In this state, the preloading elements 222*a* of the second protective ground conductor contacts 222 and the preloading element 240*a* of the contact restoring element 240 provide the preloading forces.

FIGS. 4*a* to 4*d* each show a schematic illustration of the first connecting part 100 and of the second connecting part 200 in different positions with respect to one another. In particular, the manner in which the different elements of the contact unit 1 cooperate becomes apparent.

Figure 4:
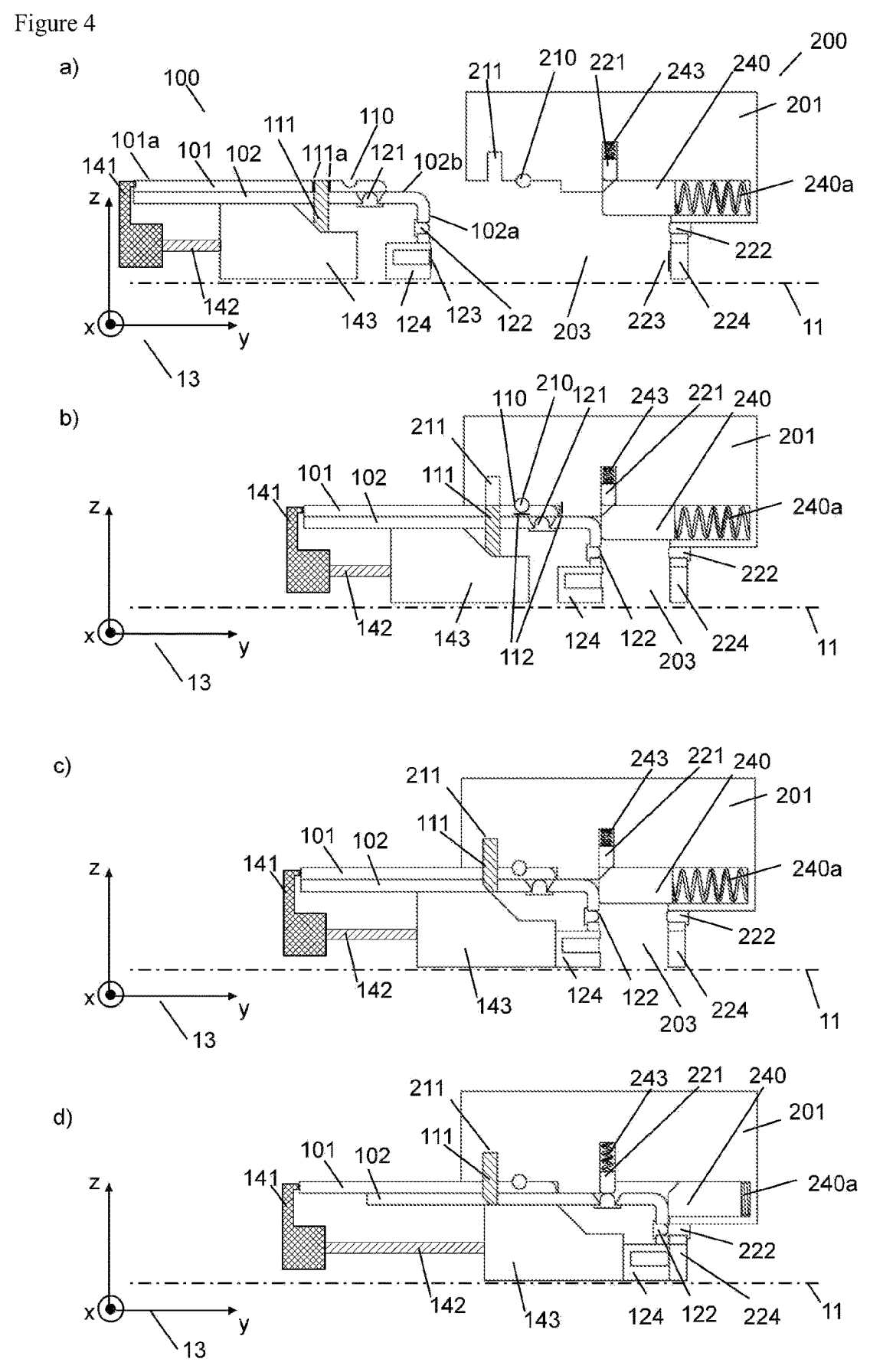

FIG. 4*a* schematically shows the first connecting part 100 and the second connecting part 200 in a two-dimensional projection. A first connecting part 100 and a second connecting part 200 are oriented along the contacting axes 11. The contacting axis 11 points in the y direction of the coordinate system 13. The coordinate axes in the z direction and x direction are in each case oriented perpendicular to the contacting axis 11. The schematic illustration in FIG. 4*a* is simplified, assuming symmetry with respect to the contacting axis 11. For this reason, only one half of the two-dimensional projection is illustrated, since the other half results from the assumed symmetry of the projection.

FIG. 4*a* accordingly shows the first section 101, the second section 102 and a tensioning element 143 of the first connecting part 100. Moreover, the locking recess 110 and the latching element 111 are shown. Likewise shown are the first contact 121, the first protective ground conductor contact 122 and the solenoid 124. Furthermore, the basic structure 201 of the second connecting part 200, the latching recess 211 and the locking element 210 are shown. In addition, there are the contact restoring element 240 and the preloading element 240*a* of the contact restoring element 240 as well as the second contact 221, the preloading element 243 of the second contact 221 and the second protective ground conductor contact 222 of the second connecting part 200. Additionally, the first control pilot contact 123 and the second control pilot contact 223 are shown in FIG. 4*a*.

In FIG. 4*a*, the first connecting part 100 is located outside the second connecting part 200. However, the first and second connecting parts 100, 200 are in a position with respect to one another in which these are movable with respect to one another on the contacting axis 11 and can be pushed toward one another. With respect to the coordinate system 13 and proceeding from the configuration in FIG. 4*a*, the first connecting part 100 can be at least partially inserted into the second connecting part 200 by displacing the first connecting part 100 in the direction of the positive y coordinate. In FIG. 4*a*, the latching element 111 is in a position in which this does not protrude from the side surface 101*a* of the first section 101 in a direction perpendicular to the contacting direction. This position of the latching element 111 is also (cannot be directly derived from the illustration) an unlatching position and a locking position. It is an unlatching position since the first and second connecting parts 100, 200 are not latched to one another in this way, that is, can move with respect to one another. It is a locking position since the second section 102 cannot move with respect to the first section 101. It is furthermore apparent that the first electrical contact 121 is concealed by the first section 101 of the first connecting part 100, and it is apparent that the second electrical contact 221 is concealed by the contact restoring element 240 and accordingly is not accessible from a cavity 203. The contact restoring element 240 is pushed by the preloading element 240*a* of the contact restoring element 240 toward the cavity 203. The movement of the contact restoring element 240 is limited in FIG. 4*a* by a protrusion in the basic structure 201.

FIG. 4*a* moreover shows an actuator 140 comprising an actuator drive 141, for example an electric motor, an actuator connector 142, for example a threaded rod, and the tensioning element 143. The actuator drive 141 is designed to move the actuator connector 142 in the y direction. The actuator connector 142 is coupled to the tensioning element 143, for example by way of a screw connection. The actuator drive 141 is designed to be controllable so that it is possible to adjust a position of the tensioning element 143 in the y direction via a control of the actuator drive 141. The actuator drive 141 can be arranged in a fixation section or form the same at least partially, for example with an actuator drive housing. The actuator connector 142 and the tensioning element 143 can form a movement section, wherein the movement section is arranged so as to be movable with respect to the fixation section. The fixation section is rigidly connected to the first section 101.

The illustration in FIG. 4*b* is almost identical to the illustration in FIG. 4*a*, the difference being that the first connecting part 100 is now in the idle position. In this idle position, the locking element 210 is engaged with the locking recess 110. Conversely, the locking element 210 and the locking recess 110 can define the idle position as a result of the engagement. FIG. 4*b* furthermore shows an idle position sensor 112, which is dispensed with in the other figures for the sake of clarity. The idle position sensor 112 is used to recognize whether the first connecting part 100 is in the idle position or not. As is shown in FIG. 4*b*, the idle position sensor can be placed in multiple positions, for example at or in the basic structure 201 of the second connecting part 200 or at or in the first section 101 of the first connecting part 100. In addition, various embodiments are possible, for example as a micro push button that is actuated by way of contact between the first and second connecting parts 100, 200, or as a Hall sensor, possibly including opposing magnets, or an eddy current sensor, by way of which in each case a distance between surfaces of the first and second connecting parts 100, 200 can be ascertained. Signals provided by the aforementioned sensors 112 can be processed in the control unit 300 (FIG. 1). The second electrical contact 221 is concealed by the contact restoring element 240 and is therefore not accessible proceeding from the cavity 203.

The illustration in FIG. 4*c* differs from the illustration in FIG. 4*b* by the position of the tensioning element 143. The shape of the latching element 111 is matched to the shape of the tensioning element 143. As a result, the latching element 111 can be displaced by a displacement of the tensioning element 143. The displacement of the tensioning element 143 is possible with the aid of the actuator drive 141, which is connected to the tensioning element 143 via the actuator connector 142.

In FIG. 4*c*, the latching element 111 is inserted into the recess 211 in the second connecting part 200. The first section 101 is thus non-displaceably positioned in the second connecting part 200. This means that the first section 101 cannot move relative to the second connecting part 200. However, a movement of the second section 102 relative to the first section 101 is possible in this position (not visible in FIG. 4*c*). In the illustrated position of the tensioning element 143, the tensioning element 143 and the solenoid 124 are in contact with one another at a surface that is oriented in each case substantially perpendicular to the contacting direction 12, so that a displacement force in the positive y direction can be exerted by the tensioning element 143 on the solenoid 124. Since the solenoid 124 is rigidly connected to the second section 102, the displacement force also acts on the second section 102 of the first connecting part 100. The second electrical contact 221 is concealed by the contact restoring element 240 and is therefore not accessible proceeding from the cavity 203.

In contrast to the illustration in FIG. 4*c*, the tensioning element 143 in FIG. 4*d* is displaced further in the positive y direction. As a result of the displacement of the tensioning element 143, the second section 102 is also displaced in the positive y direction, which, in turn, displaces the contact restoring element 240 against the preloading force of the preloading element 240*a* of the contact restoring element 240 in the positive y direction. The displacement of the contact restoring element 240 does not cause the second electrical contact 221 to be further concealed by the contact restoring element 240. The second electrical contact 221 can now be moved in the z direction so far as to make contact with the first electrical contact 121. In this position, in which the first electrical contact 121 and the second electrical contact 221 make contact with one another, an electrical connection exists between the first connecting part 100 and the second connecting part 200 so that a current flow can be conducted through the contact unit 1. The movement of the second electrical contact 221 can be carried out as a result of a preloading force, which is exerted by the mechanical spring 243 shown in FIG. 4*d* at the second electrical contact, or, for example, via the above-described kinematic coupling between the contact restoring element 240 and the second electrical contact 221. In the position of the second section 102 shown in FIG. 4*d*, the solenoid 124 together with the magnet counter-plate 224 can provide an attraction force when the solenoid 124 is in an active state, for example in that an electrical current is provided in the coil winding thereof. The current flow in the coil winding can be effectuated by an electrical current source that is electrically connected to the coil winding, which, for example, can be switched on and/or switched off with the aid of a switch. It is possible for the switch to be actuated by the control unit 300 (not illustrated). The switch may also be manually actuated. For example, the switch can be provided as an operating element 126 at the holding device 190 or by means of a user interface, by way of which a user can influence the function of the contact unit 1.

The illustrations shown in FIGS. 4*a* to 4*d* also show the order in which steps of a method can be carried out, by way of which an electrical contact can be established between the first connecting part 100 and the second connecting part 200.

The illustrations shown in FIGS. 5*a* to 5*d* have an option of the order in which steps of a method can be carried out, by way of which the electrical connection between the first connecting part 100 and the second connecting part 200 can be disconnected. FIGS. 5*a* to 5*d* each show a schematic illustration of the first and second connecting parts 100, 200 in different positions with respect to one another.

Figure 5:
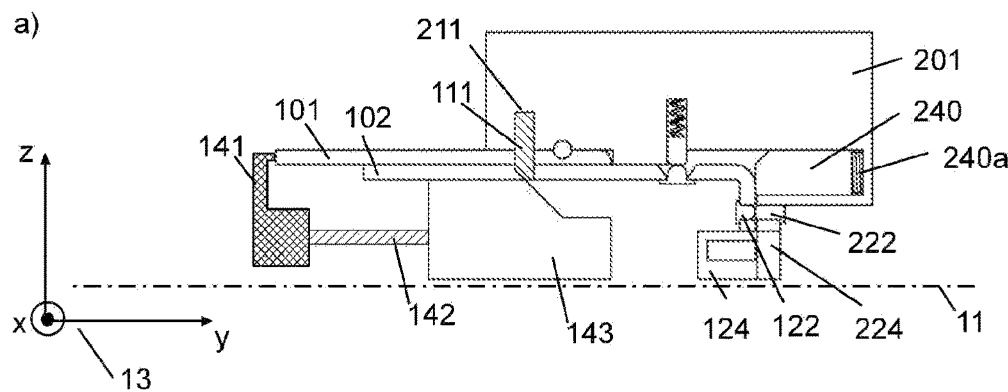
FIGS. 5*a* to 5*d*: each show a schematic illustration of the first and second connecting parts in different positions with respect to one another.
Figure 5:
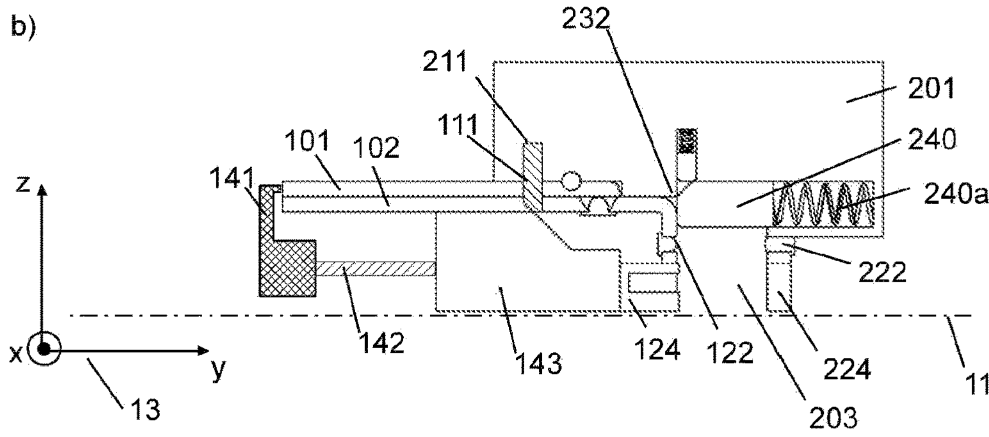
Figure 5:
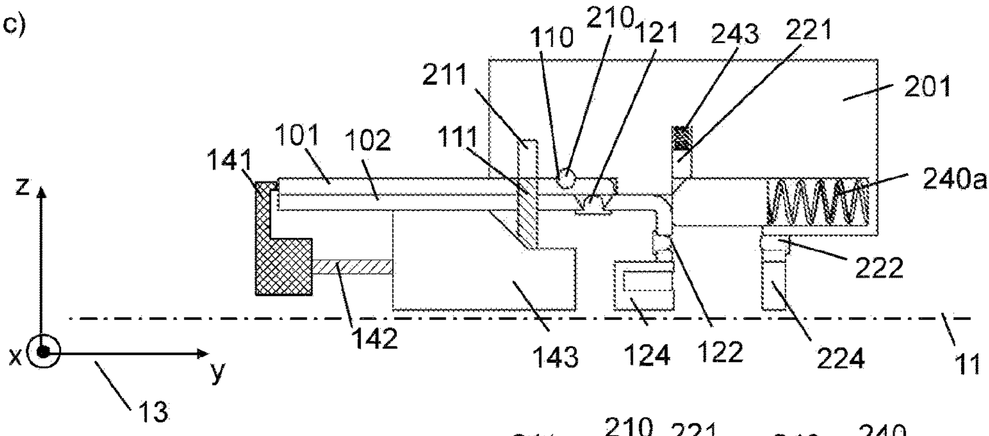
Figure 5:
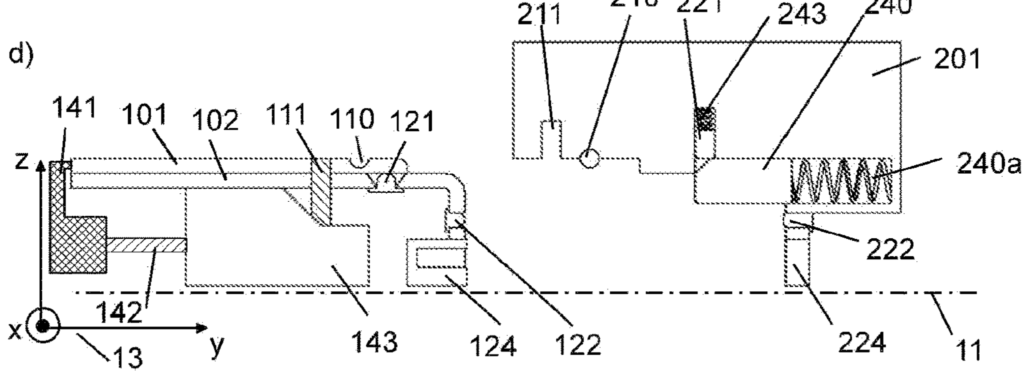

The illustration in FIG. 5*a* is similar to the illustration in FIG. 4*d*. In contrast to FIG. 4*d*, the tensioning element 143 in FIG. 5*a* is in a position that is spaced apart from the solenoid 124, in which, however, the latching element 111 is engaged with the first section 101 of the first connecting part 100 and the recess 211 in the second connecting part 200. The first electrical contact 121 and the second electrical contact 221 are in contact with one another, that is, an electrically conducting connection is present between these so that a current flow can be conducted through the contact unit 1. When the solenoid 124 is in an active state, the tensioning element 143 can be in a position that is spaced apart from the solenoid 124 since the position of the second section 102 with respect to the second connecting part 200 is maintained by the magnetic attraction forces between the solenoid 124 and the magnet counter-element 224.

If, however, the solenoid 124 is transferred into an inactive state, for example in that a current flow through the coil winding of the solenoid 124 is interrupted, no magnetic attraction forces act between the solenoid 124 and the magnet counter-element 224. As a result of a preloading force of the preloading element 240*a* of the contact restoring element 240, a restoring force is exerted via the contact restoring element 240 onto the second section 102, so that this section is displaced in the negative y direction.

The result of the movement is shown in FIG. 5*b*. The movement of the second section 102 is limited by the tensioning element 143. As is shown in FIG. 5*b*, the electrical connection between the first electrical contact 121 and the second electrical contact 221 is disconnected as a result of this movement due to the two contacts 121, 221 being spaced apart from one another. The second electrical contact 221 is concealed by the contact restoring element 240 and is therefore not accessible proceeding from the cavity 203. FIG. 5*b* also shows that the movement of the contact restoring element 240 in the negative y direction is limited by a stop at the basic structure 201.

FIG. 5*c* shows the tensioning element 143 of the first connecting part 100 in a position that is displaced in the negative y direction compared to FIG. 5*b*. In this position, the latching element 111 that is kinematically coupled to the tensioning element 143 has arrived in an unlatching position, in which the first section 101 is able to move relative to the second connecting part 200, and in which at the same time also a movement of the second section 102 with respect to the first section 101 is prevented; within this meaning, the unlatching position is also a locking position. The tensioning element 143 and the solenoid 124 are now no longer in contact with one another. FIG. 5*c* is similar to FIG. 4*b*, that is, this positioning of the elements of the contact unit 1 can occur both when the electrical connection is being established and when the electrical connection is being disconnected.

The first connecting part 100 can now be separated from the second connecting part 200 by displacement along the contacting direction 12, or more precisely in the negative y direction. The result of the separation is shown in FIG. 5*d*. FIG. 5*d* is similar to FIG. 4*a*, that is, this positioning of the elements of the contact unit 1 can occur both when the electrical connection is being established and when the electrical connection is being disconnected.

Figure 6:
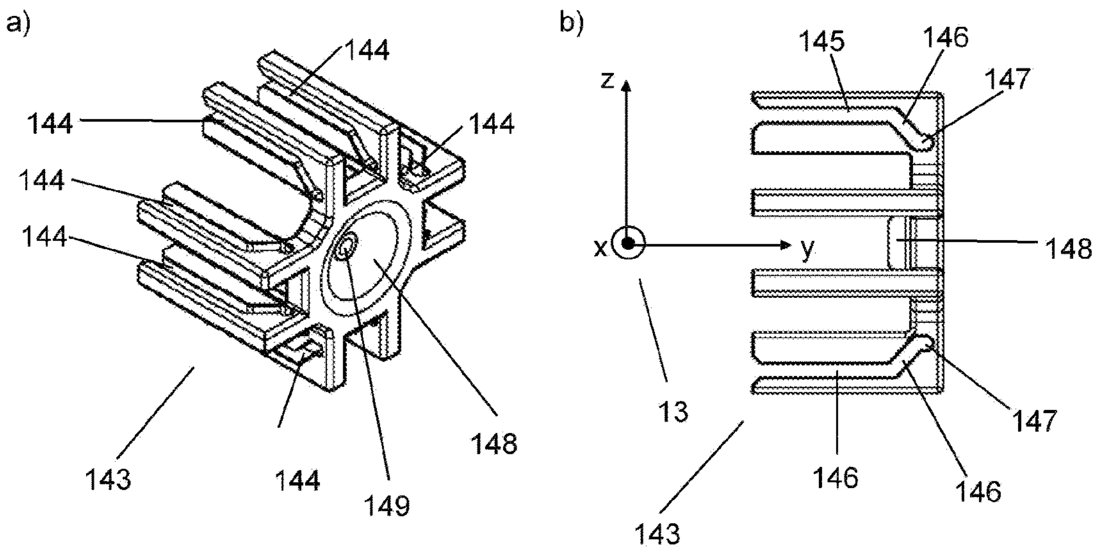
FIGS. 6*a* to 6*b*: each show a schematic illustration of a tensioning element.
FIGS. 6*c* to 6*d*: each show a schematic illustration of a kinematic coupling between the tensioning element and a latching element.
Figure 6:
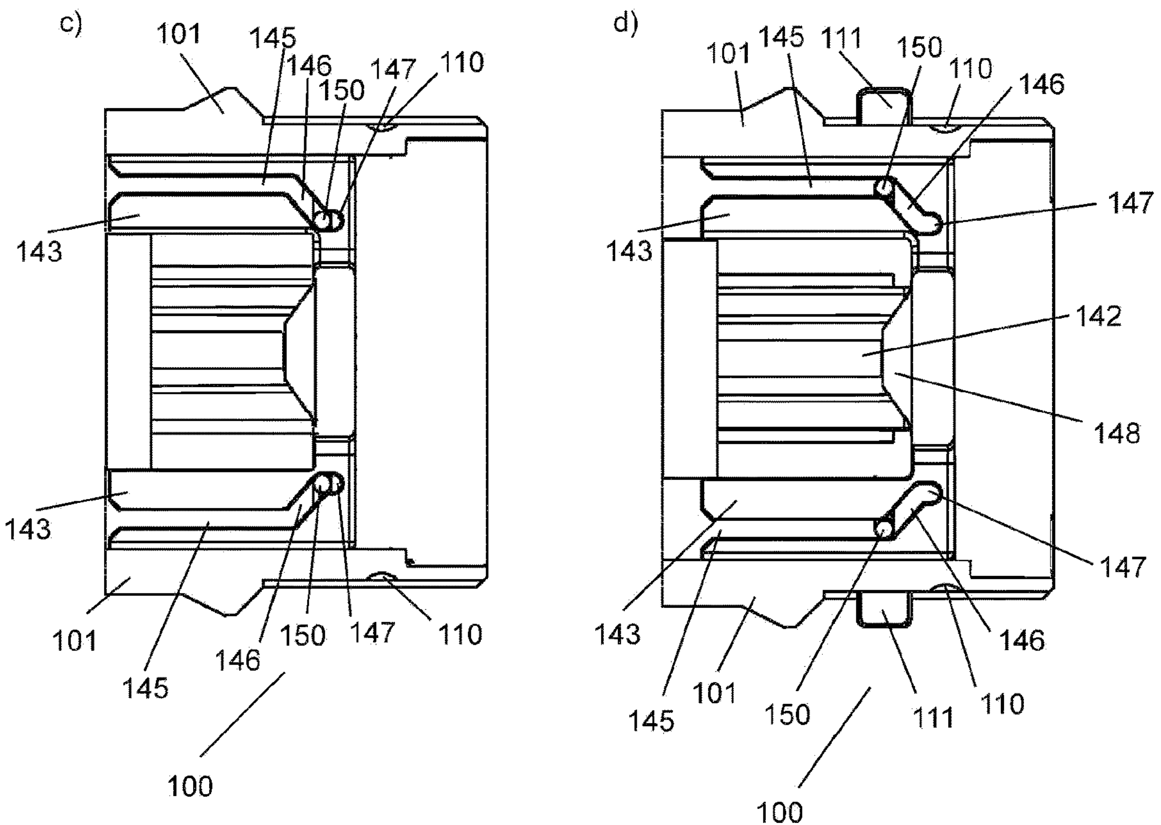

FIGS. 6*a* to 6*b* show a schematic illustration of the tensioning element 143. FIG. 6*a* shows an isometric illustration, and FIG. 6*b* shows a side illustration of the tensioning element 143. The tensioning element 143 comprises a curved tensioning disk 148 including a borehole 149 and longitudinal elements, each of which is provided with a guide groove 144.

FIG. 6*b* shows the coordinate system 13. The guide groove 144 comprises three sections 145, 146 and 147, which can be seen particularly well in FIG. 6*b*. These are an elongated section 146 extending in the y direction, a short section 147 extending in the y direction, and a transition section 146, which connects the elongated section 145 and the short section 147. The long section 145 and the short section 147 are arranged so as to be parallel offset with respect to one another. The guide groove 144 is designed to guide a guide pin 150 (shown in FIGS. 6*c* and 6*d*) of the latching element 111 (not illustrated here). When the tensioning element 143 is displaced in the y direction, this guide pin 150, which is arranged in the guide groove 144 and guided by the guide groove 144, is moved in the z direction. The exact position of the guide pin 150 in the z direction is predefined by the position of the tensioning element in the y direction. In this way, the latching element 111, which is rigidly connected to the guide pin 150, can be moved in the z direction. The tensioning disk 148 and the borehole 149 can be used to couple the tensioning element 143 via the actuator connector 142 (not illustrated here), for example a threaded rod, to the actuator drive 141, for example a linear motor, for example by pushing the threaded rod through the borehole 149 and attaching it there by way of a screw connection.

FIGS. 6*c* to 6*d* show schematic illustrations of the kinematic coupling between the tensioning element 143 and the latching element 111. The coordinate system 13 of FIG. 6*b* can be applied mutatis mutandis to FIGS. 6*c* and 6*d*. It is apparent that the guide pin 150, which, for example, can have a cylindrical shape and which is rigidly connected to the latching element 111, and it being possible for the cylinder axis to be oriented in the x direction, is arranged in the guide groove 144. FIG. 6*c* shows a position of the tensioning element 143 in which the guide pin 150 is situated in the short section 147 of the guide groove 144. Here, the latching element 111 does not protrude from the first section 101 of the first connecting part 100. In FIG. 6*d*, the tensioning element 143 is displaced in such a way that the guide pin 150 is situated at one end of the elongated section 145 of the guide groove 144. The guide pin 150 is displaced in the z direction in such a way that the latching element 111 rigidly coupled thereto protrudes from the first section 101 of the first connecting part 100.

Figure 7:
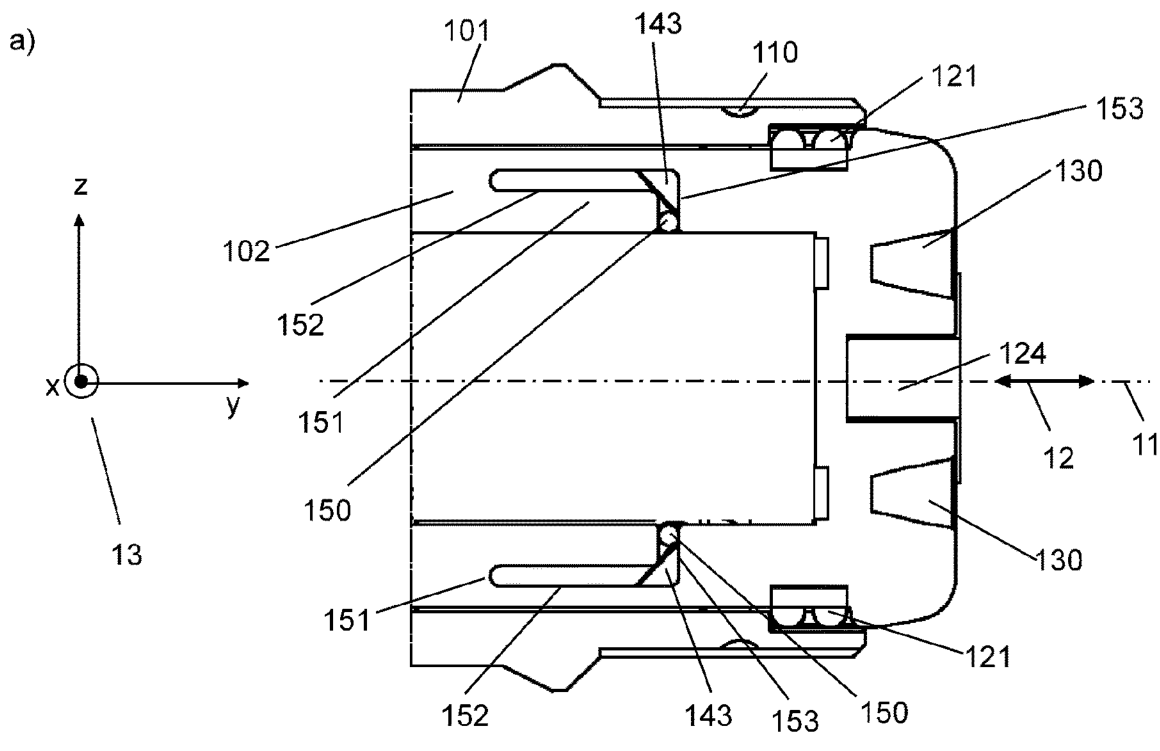
FIGS. 7*a* to 7*b*: each show a schematic illustration of locking and unlocking a second section of the first connecting part.
Figure 7:
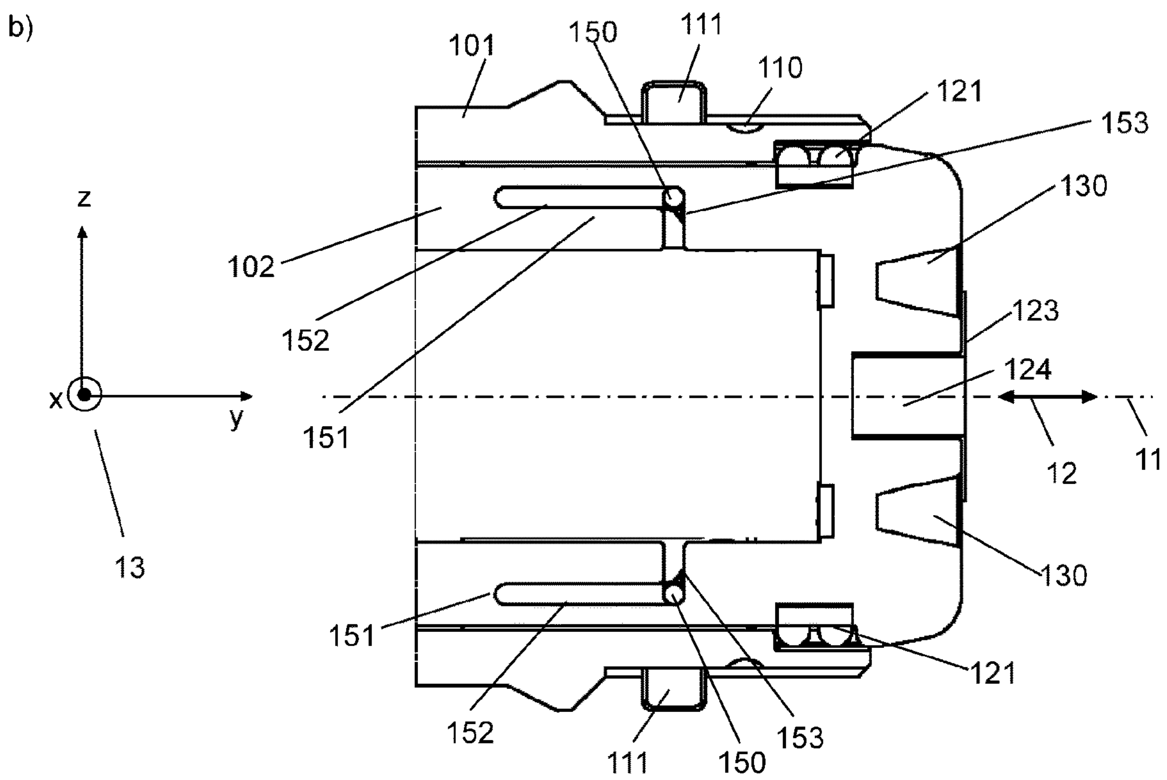

FIGS. 7*a* to 7*b* show schematic illustrations of locking and unlocking a second section 102 of the first connecting part 100. Compared to what is shown in FIGS. 6*a* to 6*d*, FIGS. 7*a* and 7*b* illustrate the second section 102 of the first connecting part 100, with other details being dispensed with or concealed in the illustration. The second section 102 comprises a locking guide groove 151 into which the guide pin 150 protrudes. The locking guide groove 151 comprises a release section 152, which extends in the y direction, and a locking section 153, which extends in the z direction.

When the guide pin 150 is in the position shown in FIG. 6*c*, which results from the position of the tensioning element 143, the position of the guide pin 150 with respect to the locking guide groove 151 corresponds to the position shown in FIG. 7*a*. This means that the guide pin 150 is situated in the locking section 153 of the locking guide groove 151. In this position, the locking guide groove 151 and the guide pin 150 prevent the second section 102 of the first connecting part 100 from being able to move in the y direction. As a result, as is illustrated in FIG. 7*a*, the second section 102 cannot slide out of the first section 101 of the first connecting part 100 which partially encloses the second section 102. In addition, it is ensured that the first electrical contact 121 is concealed by the first section 101 of the first connecting part 100, and is thus not accessible for manual contact. This feature thus allows safety requirements to be met.

When the guide pin 150 is in the position shown in FIG. 6*d*, which results from the position of the tensioning element 143, the position of the guide pin 150 with respect to the locking guide groove 151 corresponds to the position shown in FIG. 7*b*. This means that the guide pin 150 is situated in the release section 152 of the locking guide groove 151. In this position, the movement of the second section 102 of the first connecting part 100 in the y direction is permitted so that it is possible, for example, to establish an electrical connection between the first and second connecting parts 100, 200.

Figure 8:
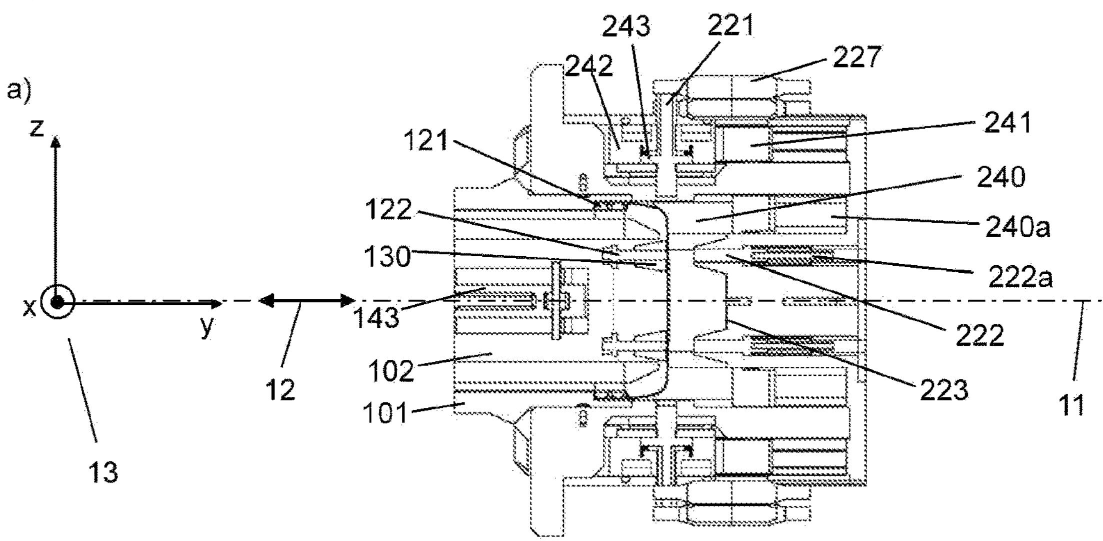
FIGS. 8*a* to 8*c*: each show a schematic illustration of the first and second connecting parts while an electrical connection is being established between the first and second connecting parts.
Figure 8:
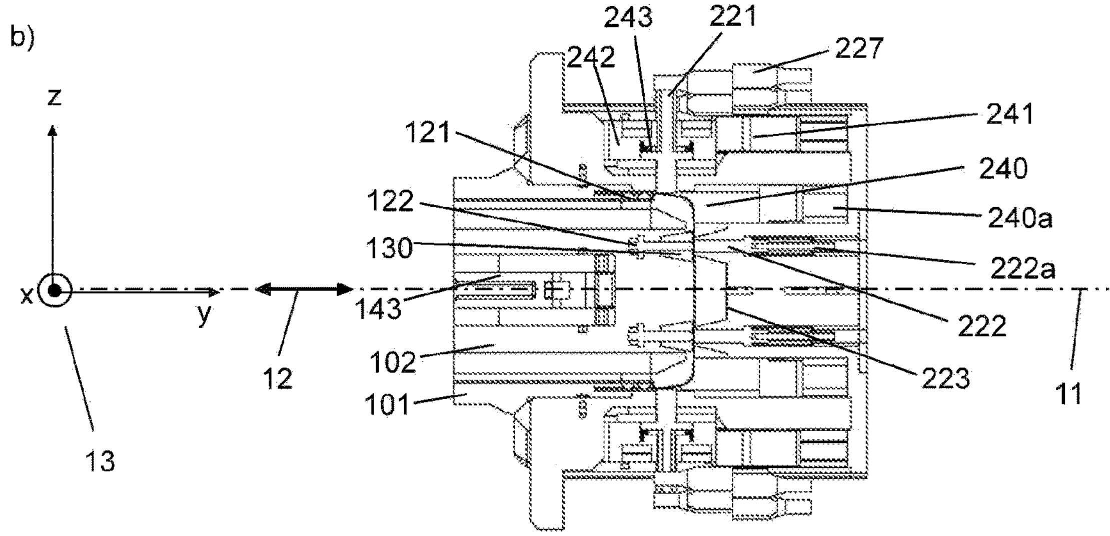
Figure 8:
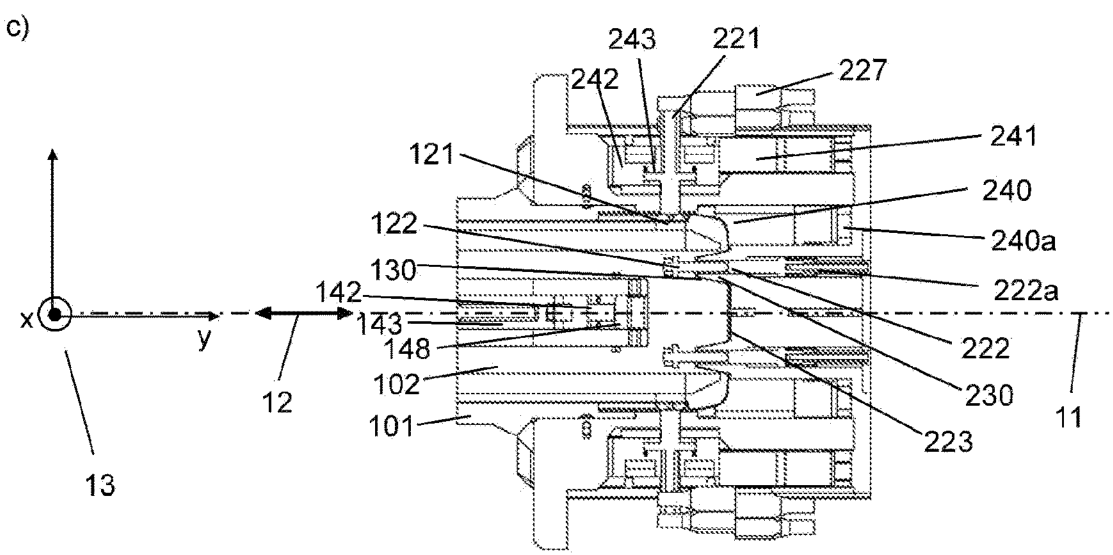

FIGS. 8*a* to 8*c* show schematic illustrations of the first and second connecting parts 100, 200 while an electrical connection is being established between the first and second connecting parts 100, 200. The figures show various sectional illustrations and different levels of detail. FIG. 8*a* shows the first connecting part 100 in the idle position. This position corresponds to the position shown in FIG. 4*c*. Furthermore, the first protective ground conductor contacts 122 of the first connecting part 100 and the second protective ground conductor contacts 222 of the second connecting part 200 are apparent, which do not make contact with one another in this position.

FIG. 8*b* shows a second section 102 that is displaced in the contacting direction 12, that is, the y direction, in particular the positive y direction, compared to FIG. 8*a*. The second section 102 makes contact with the contact restoring element 240, wherein the displacement of the second section 102 causes the contact restoring element 240 to be displaced. The second electrical contact 102 is thus no longer concealed by the contact restoring element 240. Moreover, the movement of the contact restoring element 240 is transmitted via the connecting element 241 to the displacement element 242 so that the displacement element 242 can be seen in FIG. 8*b* in a position in which the second electrical contact 221 connected to the displacement element 242 is displaced in the direction of the first electrical contact 121. It is apparent that no electrical connection exists yet between the first electrical contact 121 and the second electrical contact 221, while the first protective ground conductor contact 122 and the second protective ground conductor contact 222 are in contact with one another, that is, an electrical connection is established between these.

FIG. 8*c* shows a second section 102 that is displaced in the contacting direction 12, that is, the y direction, specifically in the positive y direction, compared to FIG. 8*b*. It is apparent how the protrusion 230 of the second connecting part 100 is engaged with the recess in the second section 102 of the first connecting part 100. The first electrical contact 121 and the second electrical contact 221 are now in contact with one another, so that an electrical connection exists, over which also a high electrical current can be conducted.

Figure 9:
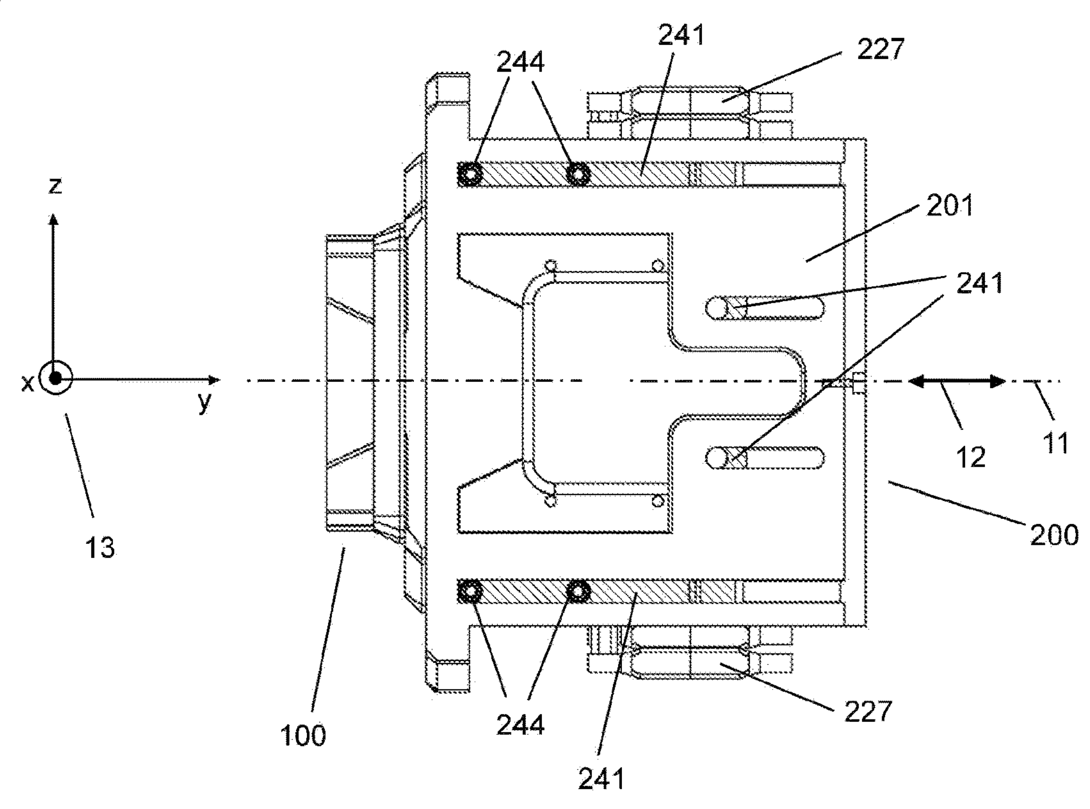
FIGS. 9*a* to 9*b*: each show a schematic illustration of a kinematic coupling between a contact restoring element and a second electrical contact.
Figure 9:
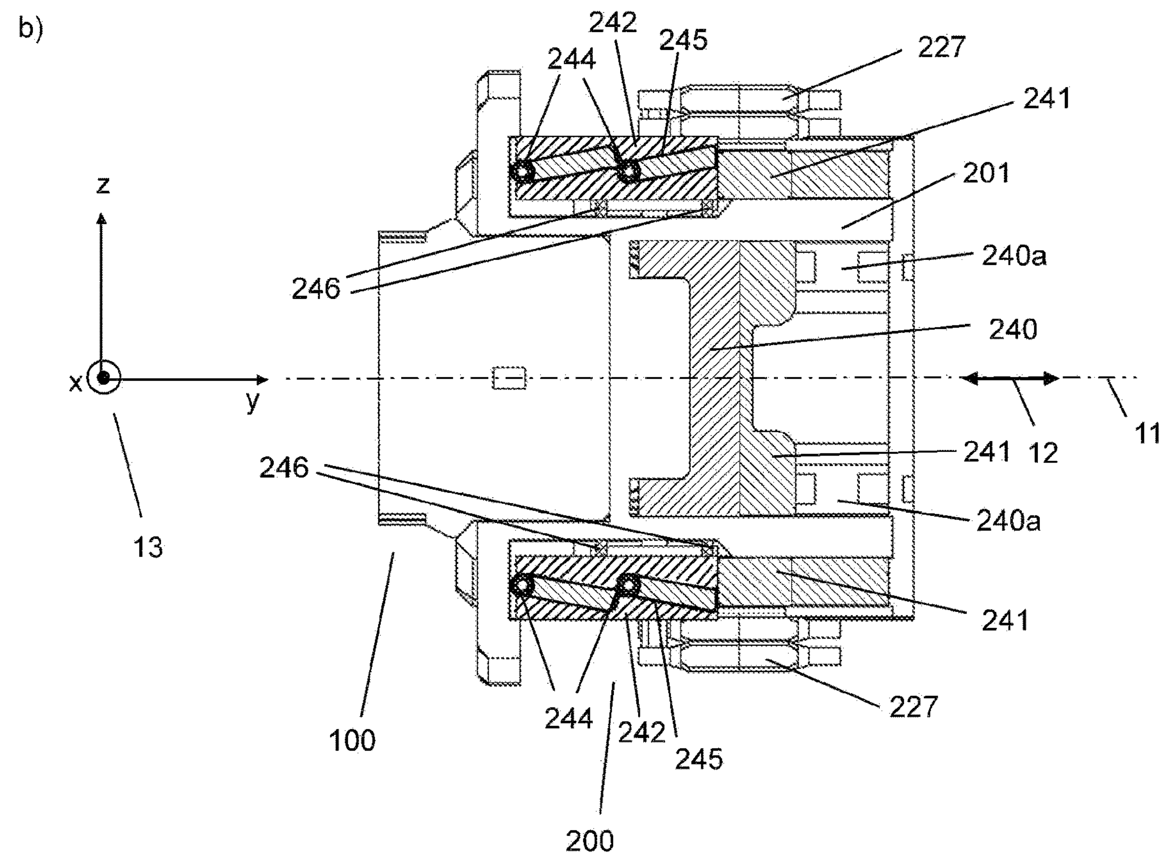

FIGS. 9a and 9b show schematic illustrations of the kinematic coupling between the contact restoring element 240 and the second electrical contact 221, as it is used in the contact unit 1 of FIGS. 8a to 8c. FIG. 9a shows rolling bearings 244, for example ball bearings, which are provided at the connecting element 241, for example by way of a rigid connection between an inner ring of the rolling bearing 244 and the connecting element 241. This means that, when the connecting element 241 is being displaced in the y direction, for example by a displacement of the contact restoring element 240 in the y direction, the rolling bearings 244 are displaced in the y direction at the same time. Each of the rolling bearings 244 protrudes, as is apparent in FIG. 9b, into a section of a guide groove 245 of the displacement element 242. Each section of the guide groove 245 is configured in such a way that the respective rolling bearing 244 is able to carry out an extended movement with respect to the guide groove 245 in the y direction, and a less extended, that is, short, movement in the z direction. The ratio of the extended movement to the short movement is proportional to a force transmission ratio between a displacement force acting on the force restoring element 240 and a force engaging at the second electrical contact 221 and acting in the direction of the first electrical contact 121.

The displacement element 242 moreover has a fixation in the y direction. This fixation is implemented by the guide boreholes (not visible) in the z direction, which are introduced into the displacement element 242, and guide cylinders 246 fixed to the basic structure 201, along which the displacement element 242 is able to move. As a result of this design, when the contact restoring element 240 moves in the y direction, it is now possible for this movement to be transformed in a z direction of the displacement element 242.

Figure 10:
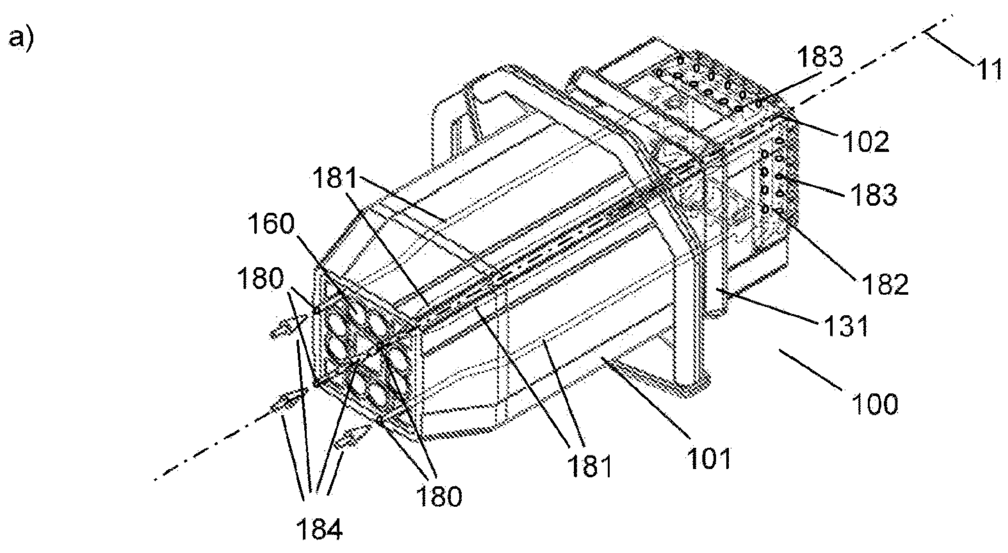
FIGS. 10*a* to 10*c*: each show a schematic illustration of an air guidance for temperature conditioning.
Figure 10:
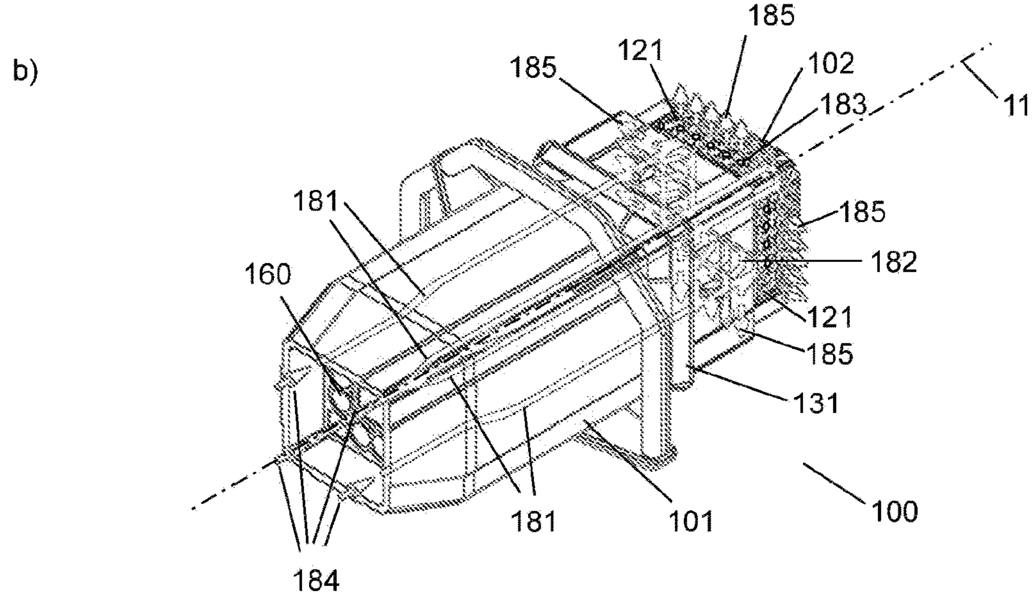
Figure 10:
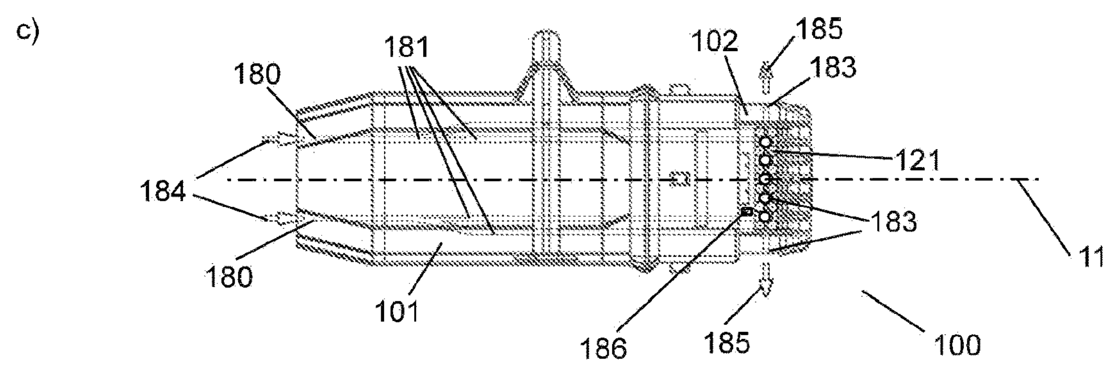

FIGS. 10a to 10c each show a schematic illustration of an air guidance for temperature conditioning. FIG. 10a will be described first. Inflowing air 184 is provided at the air inlet openings 180, for example by means of a pressurized air reservoir that is fluidically connected to the air inlet openings 180 or, for example, by means of a compressor or blower fluidically connected to the air inlet openings 180. In this example, the air inlet openings 180 are arranged at a surface of the second section 102 of the first connecting part 100 located opposite the end face 102a (not visible). Via the air inlet openings 180, the inflowing air 184 reaches air guidance channels 181, proceeding from which the air spreads into an air distributor 182. It is the task of the air distributor 182 to distribute the air 184 that has flown in, prior to flowing out of the air distributor 182, in the first connecting part 100 in such a way that the outflowing air 185, that is, the air that flows out of the air distributor 182 at the air outlet opening 183, is provided at the first electrical contact 121 in a way that is as evenly spatially distributed as possible. After flowing out, the air 185 that has flown out passes over the first electrical contact 121, taking up an amount of heat that can arise due to the electrical current conduction in the first electrical contact 121. As a result, the first electrical contact 121 is cooled, and the air is heated. FIG. 10a moreover shows an electrical conductor 160, which is connected to the first electrical contact 121. The electrical conductor 160 is designed to conduct large electrical currents, for example up to 1600 A, preferably 1900 A, and particularly preferably 3000 A. Using the electrical conductor 160, for example, an electrical connection can be established between the first electrical contact 121 and an electrical energy source or an electrical energy sink.

FIG. 10b shows the design illustrated in FIG. 10a in a likewise perspective view. Arrows are additionally shown compared to FIG. 10a, which are intended to mark the outflowing air 185. It is apparent that the outflowing air 185 flows out of the air outlet openings 183, next to the first electrical contact 121. The exit direction is substantially perpendicular to the contacting axis 11.

FIG. 10c shows the design from FIG. 10b in a side view, wherein here in particular also the first electrical contact 121 can be seen well. In addition, FIG. 10c also shows a temperature sensor 186 by way of example, which is able, for example, to detect a temperature in the surrounding area of the first electrical contact 121 and provide the detected temperature, for example, as a corresponding signal to the control unit 300. It is also possible to arrange the temperature sensor in another location in the first connecting part 100, for example at or in an air guidance channel 181, at or in the air distributor 182 or at an electrical conductor 160. One possible criterion for placing the temperature sensor can also be that a conclusion may be drawn from the measured temperature as to whether, for example, a material-based temperature limit value of a material used in the contact unit is being exceeded or fallen short of. The temperature measured by the temperature sensor 186 can be provided as a signal to the control unit 300.

Figure 11:
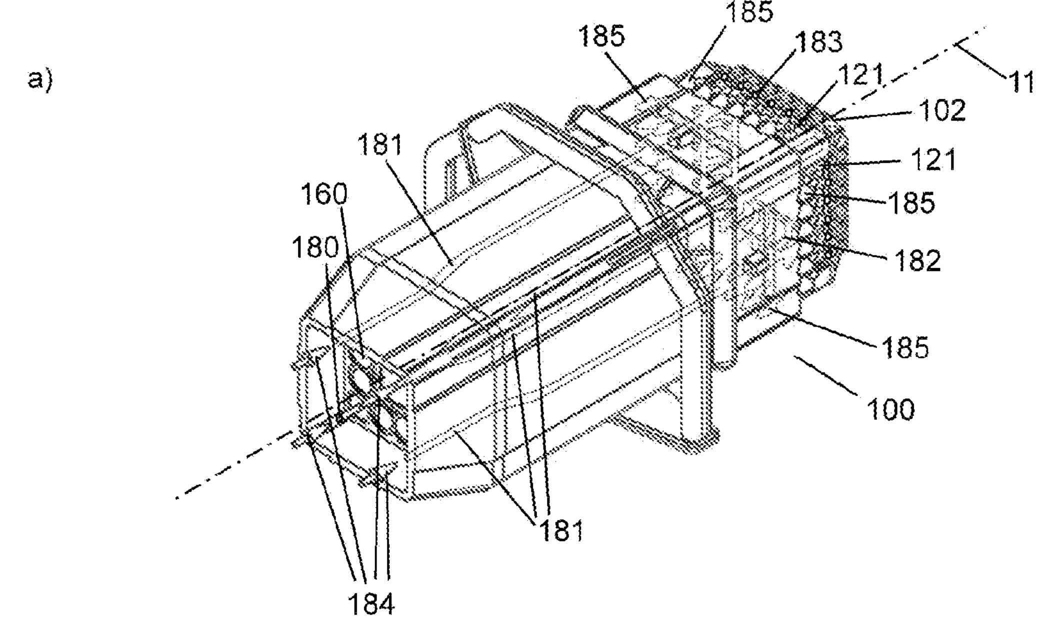
FIGS. 11*a* to 11*b*: each show a schematic illustration of an alternative air guidance for temperature conditioning.
Figure 11:
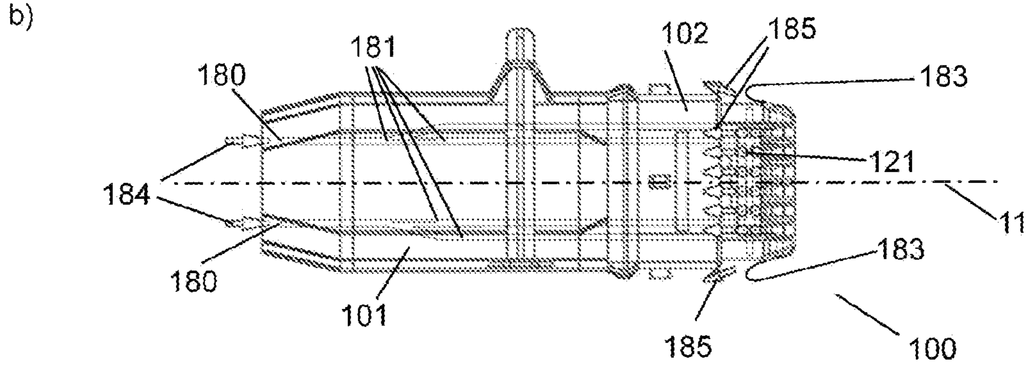

FIGS. 11a and 11b show schematic illustrations of an alternative air guidance for temperature conditioning. In contrast to the embodiment shown in FIGS. 10a to 10c, the air outlet openings 183 are now oriented in such a way that the outflowing air 185 does not flow out perpendicular to the contacting axis 11, but at an angle inclined with respect to the contacting axis 11, so that the air flow direction has a component in the direction of the contacting axis 11. This way, the outflowing air 185 is conducted more deliberately to the first electrical contact 121. The cooling action of the outflowing air 185 can thus be enhanced. FIG. 11a shows this embodiment in a perspective view, and FIG. 11b shows this in a side view.

Figure 12:
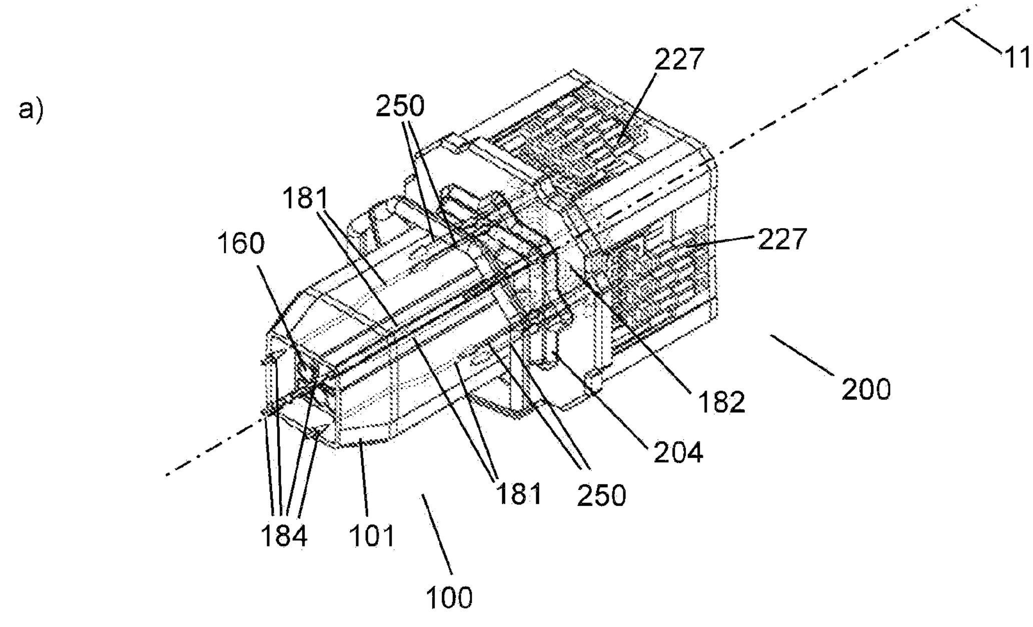
FIGS. 12*a* to 12*b*: each show a schematic illustration of the alternative air guidance for temperature conditioning including the first and second connecting parts.
Figure 12:
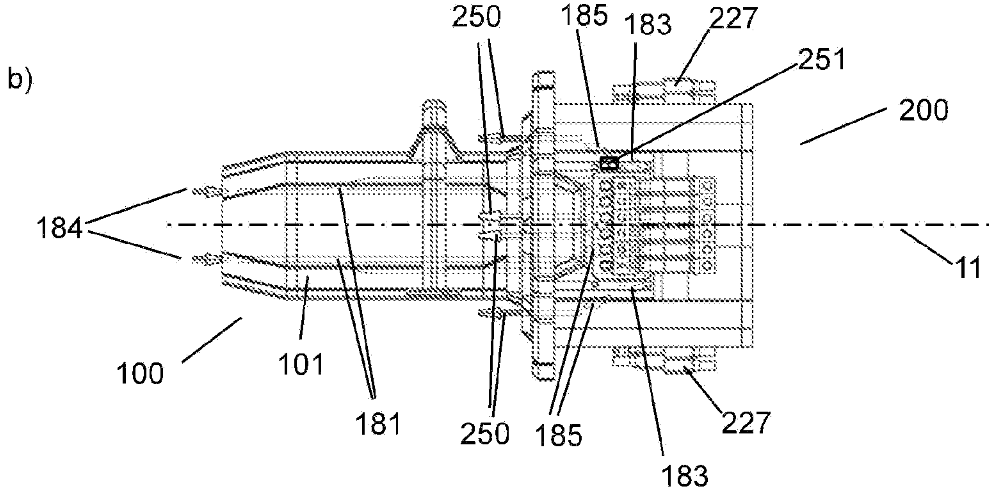

FIGS. 12a and 12b show schematic illustrations of the alternative air guidance for temperature conditioning including the first and second connecting parts 100, 200. FIG. 12a shows the first and second connecting parts 100, 200 in a position with respect to one another in which an electrical connection exists between the first and second connecting parts 100, 200. The first connecting part 100 corresponds to the first connecting part 100 from FIGS. 11a and 11b. Here, the outflowing air 185 is conducted over the first electrical contact 121 and the second electrical contact 221, where it can take up heat that is produced. The outflowing air 185 thus reaches the cavity 203 (not shown), and can then leave the cavity 203 via orifices and flow out as waste air 250.

FIG. 12b shows this from a side perspective view. In addition, FIG. 12b also shows a temperature sensor 251 by way of example, which is able, for example, to detect a temperature in the surrounding area of the second electrical contact 221 and provide the detected temperature, for example, as a corresponding signal to the control unit 300. It is also conceivable, for example, that the control unit 300 controls the current intensity of the current flowing through the electrical connection between the first electrical contact 121 and the second electrical contact 221 as a function of the value of the detected temperature in such a way that the current intensity is reduced, for example in the case of a temperature that is close to an upper, predefined limit value. In this application, the option also exists for the control unit

300 to output a signal, based on which more air and/or more coolant for cooling the contact unit 1 are provided. It is also possible to arrange the temperature sensor 251 in another location in the second connecting part 200, for example at or in the cavity 203 or at an electrical conductor 227. One possible criterion for placing the temperature sensor can also be that a conclusion may be drawn from the measured temperature as to whether, for example, a material-based temperature limit value of a material used in the contact unit is being exceeded or fallen short of.

The contact unit 1 can be used to connect a rechargeable battery bank in a vehicle to an energy source. For this purpose, the first electrical contact 121 of the first connecting part 100 can be electrically connected to the electrical conductor 160 arranged in the first connecting part 100 and can be connected via the same to an electrical energy source. Likewise, the second electrical contact 221 of the second connecting part 200 can be electrically connected to the electrical conductor 227 arranged in the second connecting part 200 and can be connected via the same to, for example, a rechargeable battery bank.

It is also possible for electrical energy in the form of electrical current to be conducted from the energy store, which then serves as an energy source, into the supply network, which then represents an energy sink, through the contact unit 1, for example for stabilizing the electrical supply network or a portion of the electrical supply network and/or, generally speaking, for providing a power of the energy store expedient for the network. For this purpose, the supply network can be electrically connected, for example, to the first electrical contact 121, and the energy store can be electrically connected to the second electrical contact 221. It is likewise conceivable that, for example, the electrical supply network is electrically connected to the second electrical contact 221, and the energy store is electrically connected to the first electrical contact 121.

LIST OF REFERENCE NUMERALS

1 contact unit
11 contacting axis
12 contacting direction
13 Cartesian coordinate system
100 first connecting part
101 first section
101*a* side surface of the first section
102 second section
102*a* end face of the second section
102*b* side surface of the second section
110 locking recess
111 latching element
111*a* latching recess
112 idle position sensor
121 first electrical contact
122 first protective ground conductor contact
123 first control pilot contact
124 solenoid
126 operating element
130 recess for protective ground conductor in the first connecting part
131 stop edge
132 protrusion in the second section of the first connecting part
140 actuator
141 actuator drive
142 actuator connector
143 tensioning element
144 guide groove of the tensioning element
145 long section
146 connecting section
147 short section
148 tensioning disk
149 borehole
150 guide pin
151 locking guide groove
152 release section
153 locking section
160 electrical conductor
180 air inlet opening
181 air guidance channel
182 air distributor
183 air outlet opening
184 inflowing air/air that has flown in
185 outflowing air/air that has flown out
186 temperature sensor
190 holding device
191 spacer
200 second connecting part
201 basic structure of the second connecting part
201*a* end face of the second connecting part
202 side surface of the second connecting part
203 cavity
204 sealing element
210 locking element
211 recess
221 second electrical contact
222 second protective ground conductor contact
222*a* preloading element of the protective ground conductor contact
223 second control pilot contact
224 magnet counter-element
227 electrical conductor
230 protrusion
231 borehole
232 stop
240 contact restoring element
240*a* preloading element of the contact restoring element
241 connecting element
242 displacement element
243 spring element
244 rolling bearing
245 guide groove of the displacement element
246 guide cylinder
250 waste air
251 temperature sensor
300 control unit
301 first control unit
302 second control unit

The invention claimed is:

1. A contact unit for establishing an electrically conducting connection, comprising:

a first connecting part including a first electrical contact and a second connecting part including a second electrical contact, the first connecting part and the second connecting part being arranged so as to be movable with respect to one another along a contacting axis, which extends in a contacting direction;

the first connecting part comprising a first section and a second section, the second section being movable with respect to the first section, and the first electrical contact being arranged at the second section;

the first connecting part being positionable with respect to the second connecting part along the contacting axis in such a way that the first section of the first connecting part ends up in an idle position with respect to the second connecting part; and the first electrical contact and the second electrical contact being designed, when they make contact with one another, to establish an electrically conducting connection between the first connecting part and the second connecting part, which is designed to conduct electrical energy;

a positioning unit, which is designed to predefine the idle position; and an actuator, which is designed, when the first section of the first connecting part is in the idle position, to displace the second section of the first connecting part in the contacting direction relative to the first section in such a way that the second section of the first connecting part and the second connecting part rest against one another in the contacting direction, and the first electrical contact and the second electrical contact are in contact with one another;

further comprising a latching element, the latching element being movable between a latching position and an unlatching position, the latching element being designed:

in the latching position, to prevent a movement of the first section of the first connecting part relative to the second connecting part, and to allow a movement of the second section of the first connecting part relative to the first section of the first connecting part, and in the unlatching position, to permit a movement of the first section of the first connecting part relative to the second connecting part, and to prevent a movement of the second section of the first connecting part relative to the first section of the first connecting part.

2. The contact unit according to claim 1, wherein the first section of the first connecting part includes a recess and the second connecting part in includes a recess, the latching element being designed, in the latching position, to be engaged with the recess of the first section of the first connecting part and the recess of the second connecting part.

3. The contact unit according to claim 1, wherein the actuator is connected to the first section of the first connecting part and is designed to move the latching element between the latching position and the unlatching position.

4. The contact unit according to claim 1, comprising a solenoid and a magnet counter-element, the solenoid being designed, in an active state and when the second section of the first connecting part and the second connecting part rest against one another in the contacting direction, to provide a magnetic attraction force between the second section of the first connecting part and the second connecting part by means of a magnetic field, together with the magnet counter-element, the magnetic attraction force being at least so large that the second section of the first connecting element is held thereby in a position in which the first electrical contact and the second electrical contact make contact with one another.

5. The contact unit according to claim 1, wherein the first electrical contact comprises a first power contact, and the second electrical contact comprises a second power contact.

6. The contact unit according to claim 1, wherein the first connecting part includes a first protective ground conductor contact, and the second connecting part includes a second protective ground conductor contact, the first protective ground conductor contact being electrically connected to electrical ground potential and being designed to establish an electrical connection between the second protective ground conductor contact and the electrical ground potential upon contact with the second protective ground conductor contact.

7. The contact unit according to claim 6, wherein the second protective ground conductor contact cooperates with a protective ground conductor preloading element, wherein the protective ground conductor preloading element is designed to provide a contact force between the first and second protective ground conductor contacts when the first protective ground conductor contact makes contact with the second protective ground conductor contact, and wherein the first and second protective ground conductor contacts are arranged opposite one another, each at a surface that is oriented substantially perpendicular to the contacting axis.

8. The contact unit according to claim 1, wherein the second connecting part comprises a movable contact protection restoring element provided with a preloading element, wherein the preloading element is designed, when the first section of the first connecting part is in the idle position, to displace the second section of the first connecting part in the contacting direction relative to the first section in such a way that the first electrical contact and the second electrical contact are spaced apart from one another.

9. The contact unit according to claim 8, wherein the second electrical contact is movable and comprises a kinematic coupling between the second electrical contact and the contact protection restoring element, the kinematic coupling being designed to transmit a movement of the contact restoring element to the second electrical contact for providing a contact with a contact force between the first electrical contact and the second electrical contact or for spacing the first electrical contact and the second electrical contact apart from one another.

10. The contact unit according to claim 1, comprising a holding device that is connected to the first connecting part and designed to provide an interface for positioning the first connecting part with respect to the second connecting part.

11. The contact unit according to claim 1, wherein the first connecting part is electrically connected to an electrical energy source, and the second connecting part is electrically connected to a chargeable electrical energy store, or the first connecting part is electrically connected to a chargeable electrical energy store, and the second connecting part is electrically connected to an electrical energy source.

12. The contact unit according to claim 1, wherein the first and/or second connecting parts include temperature conditioning, wherein the temperature conditioning is designed to set a temperature of the first and/or second connecting parts to a temperature of less than 120° C., preferably 90° C., and particularly preferably 60° C.

13. A method for recharging a storage battery of a battery-electric vehicle, comprising:

arranging a first connecting part including a first electrical contact and a second connecting part including a second electrical contact so that the first connecting part and the second connecting part can be moved with respect to one another along a contacting axis extending in a contacting direction, the first connecting part being positionable with respect to the second connecting part along the contacting axis in such a way that a first section of the first connecting part ends up in an idle position with respect to the second connecting part;

positioning the first section of the first connecting part relative to the second connecting part in the idle position;

displacing a second section of the first connecting part in the contacting direction relative to the first section so that the second section of the first connecting part and the second connecting part rest against one another in the contacting direction, and the first electrical contact and the second electrical contact are in contact with one another such that the first electrical contact is arranged at the second section;

conducting a high electrical current to charge the storage battery, further comprising moving a latching element to a latching position to prevent movement of the first section relative to the second connecting part and to allow a movement of the second section of the first connecting part relative to the first section of the first connecting part, and moving the latching element to an unlatching position to permit movement of the first section relative to the second connecting part and to prevent a movement of the second section of the first connecting part relative to the first section of the first connecting part.

14. A method for operating a contact unit, comprising:

arranging a first connecting part including a first electrical contact and a second connecting part including a second electrical contact so that the first connecting part and the second connecting part can be moved with respect to one another along a contacting axis extending in a contacting direction, the first connecting part being positionable with respect to the second connecting part along the contacting axis in such a way that a first section of the first connecting part ends up in an idle position with respect to the second connecting part;

positioning the first section of the first connecting part relative to the second connecting part in the idle position; and displacing a second section of the first connecting part in the contacting direction relative to the first section so that the second section of the first connecting part and the second connecting part rest against one another in the contacting direction, and the first electrical contact and the second electrical contact are in contact with one another such that the first electrical contact is arranged at the second section, further comprising moving a latching element to a latching position to prevent movement of the first section relative to the second connecting part and to allow a movement of the second section of the first connecting part relative to the first section of the first connecting part, and moving the latching element to an unlatching position to permit movement of the first section relative to the second connecting part and to prevent a movement of the second section of the first connecting part relative to the first section of the first connecting part.

15. The method according to claim 14, further comprising providing a magnetic attraction force between the second section of the first connecting part and the second connecting part by means of a magnetic field, the magnetic attraction force being at least so large that the second section of the first connecting element is held thereby in a position in which the first electrical contact and the second electrical contact make contact with one another.

* * * * *